United States Patent
Agiwal et al.

(10) Patent No.: US 12,279,229 B2
(45) Date of Patent: Apr. 15, 2025

(54) METHOD AND APPARATUS FOR MONITORING PAGING OCCASION IN A WIRELESS COMMUNICATION SYSTEM

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 17/680,124

(22) Filed: Feb. 24, 2022

(65) Prior Publication Data

US 2022/0272659 A1 Aug. 25, 2022

(30) Foreign Application Priority Data

Feb. 25, 2021 (KR) .................. 10-2021-0025982

(51) Int. Cl.
*H04W 68/02* (2009.01)
*H04W 4/90* (2018.01)
*H04W 72/23* (2023.01)
*H04W 74/0833* (2024.01)
*H04W 76/28* (2018.01)

(52) U.S. Cl.
CPC ............ *H04W 68/02* (2013.01); *H04W 4/90* (2018.02); *H04W 72/23* (2023.01); *H04W 74/0833* (2013.01); *H04W 76/28* (2018.02)

(58) Field of Classification Search
CPC ....... H04W 68/02; H04W 4/90; H04W 72/23; H04W 74/0833; H04W 76/28; H04W 12/06; H04W 76/50; H04W 76/27; H04W 48/12; H04W 52/0216; H04W 68/005
See application file for complete search history.

(56) References Cited

U.S. PATENT DOCUMENTS

| | | |
|---|---|---|
| 2019/0320455 A1 | 10/2019 | Chen et al. |
| 2021/0168738 A1* | 6/2021 | Shih ................. H04W 56/001 |
| 2021/0219263 A1 | 7/2021 | Gao et al. |
| 2022/0039147 A1* | 2/2022 | Lei ..................... H04W 8/24 |

(Continued)

FOREIGN PATENT DOCUMENTS

| | | |
|---|---|---|
| CN | 110972083 A | 4/2020 |
| WO | 2017150863 A1 | 9/2017 |

OTHER PUBLICATIONS

Jha, Satish C., et al. "Dual connectivity in LTE small cell networks." 2014 IEEE Globecom Workshops (GC Wkshps). IEEE, 2014. (Year: 2014).*

(Continued)

*Primary Examiner* — Sharad Rampuria

(57) ABSTRACT

The disclosure relates to a 5G or 6G communication system for supporting a higher data transmission rate. According to embodiment, the method comprises identifying whether a timer related with a small data transmission (SDT) procedure is running at the UE in a radio resource control (RRC) inactive state, while the timer is running, performing at least one of monitoring of a system information (SI) change indication or an emergency notification in any paging occasion at least once per a discontinuous reception (DRX) cycle and obtaining at least one of the SI change indication or the emergency notification, based on a result of the monitoring.

18 Claims, 15 Drawing Sheets

(56) References Cited

U.S. PATENT DOCUMENTS

| | | | |
|---|---|---|---|
| 2022/0078697 A1* | 3/2022 | Tseng | H04W 74/0833 |
| 2022/0210860 A1* | 6/2022 | Chin | H04W 72/23 |
| 2022/0232659 A1* | 7/2022 | Kim | H04W 72/23 |
| 2023/0180223 A1* | 6/2023 | Tseng | H04W 74/0833 370/329 |
| 2024/0057173 A1* | 2/2024 | Liu | H04W 24/04 |
| 2024/0224337 A1* | 7/2024 | Ozturk | H04L 1/0061 |

OTHER PUBLICATIONS

Gorringe, Chris, and Malcolm Brown. "Recommendations and best practices for creating reusable Test Signal Framework definitions." 2013 IEEE Autotestcon. IEEE, 2013. (Year: 2013).*

International Search Report and Written Opinion of the International Searching Authority dated Jun. 3, 2022, in connection with International Application No. PCT/KR2022/002739, 11 pages.

3GPP TS 38.331 V16.3.1 (Jan. 2021), Technical Specification, 3rd Generation Partnership Project; Technical Specification Group Radio Access Network; NR; Radio Resource Control (RRC) protocol specification (Release 16), Jan. 2021, 932 pages.

Huawei, et al., "Control plane common aspects for SDT," R2-2101184, 3GPP TSG-RAN WG2 #113-e, E-meeting, Jan. 25-Feb. 5, 2021, 10 pages.

Panasonic, "T319-like timer for the SDT procedure," R2-2100817, 3GPP TSG-RAN WG2 Meeting #112e, Online, Jan. 25-Feb. 5, 2021, 5 pages.

Supplementary European Search Report dated Jul. 24, 2024, in connection with European Patent Application No. 22760095.4, 15 pages.

3GPP TS 38-300 V16.4.0 (Dec. 2020), Technical Specification, 3rd Generation Partnership Project; Technical Specification Group Radio Access Network; NR; NR and NG-RAN Overall Description; Stage 2 (Release 16), Dec. 2020, 149 pages.

* cited by examiner

METHOD AND APPARATUS FOR MONITORING PAGING OCCASION IN A WIRELESS COMMUNICATION SYSTEM

CROSS-REFERENCE TO RELATED APPLICATIONS

This application is based on and claims priority under 35 U.S.C. § 119(e) of a KR Provisional application number 10-2021-0025982, filed on Feb. 25, 2021, in the Korea Patent and Trademark Office, the disclosure of which is incorporated by reference herein in its entirety.

BACKGROUND

1. Field

The present application relates generally to wireless communication systems, more specifically, the present disclosure relates to monitoring paging occasion during data transmission in a radio resource control (RRC) inactive state.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The present disclosure relates to monitoring paging occasion during data transmission in a radio resource control (RRC) inactive state.

In one embodiment, a method performed by a user equipment in a wireless communication system is provided. The method includes identifying whether a timer related with a small data transmission (SDT) procedure is running, while the timer is running, performing at least one of monitoring an system information (SI) change indication or monitoring of an emergency notification in any paging occasion at least once per a discontinuous reception (DRX) cycle, and obtaining at least one of the SI change indication or the emergency notification, based on a result of the monitoring.

In another embodiment, a method performed by a base station in a wireless communication system is provided. The method includes receiving uplink data on a small data transmission (SDT) resource from a user equipment (UE) in an RRC inactive state, and transmitting at least one of a system information (SI) change indication or an emergency notification to the UE, wherein while a timer related with the SDT procedure is running at the UE, at least one of monitoring of the SI change indication in any paging occasion at least once per SI modification period or monitoring of the emergency notification in any paging occasion at least once per a discontinuous reception (DRX) cycle is performed at the UE.

In another embodiment, a user equipment (UE) in a wireless communication system is provided. The UE includes a transceiver, and a processor coupled with the transceiver and configured to identify whether a timer related with a small data transmission (SDT) procedure is running, while the timer is running, perform at least one of monitoring an system information (SI) change indication or monitoring of an emergency notification in any paging occasion at least once per a discontinuous reception (DRX) cycle, and obtain at least one of the SI change indication or the emergency notification, based on a result of the monitoring.

In another embodiment, a base station in a wireless communication system is provided. The base station includes a transceiver, and a processor coupled with the transceiver and configured to receive uplink data on a small data transmission (SDT) resource from a user equipment (UE) in an RRC inactive state, and transmit at least one of a system information (SI) change indication or an emergency notification to the UE, wherein while a timer related with the SDT procedure is running at the UE, at least one of monitoring of the SI change indication in any paging occasion at least once per SI modification period or monitoring of the emergency notification in any paging occasion at least once per a discontinuous reception (DRX) cycle is performed at the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
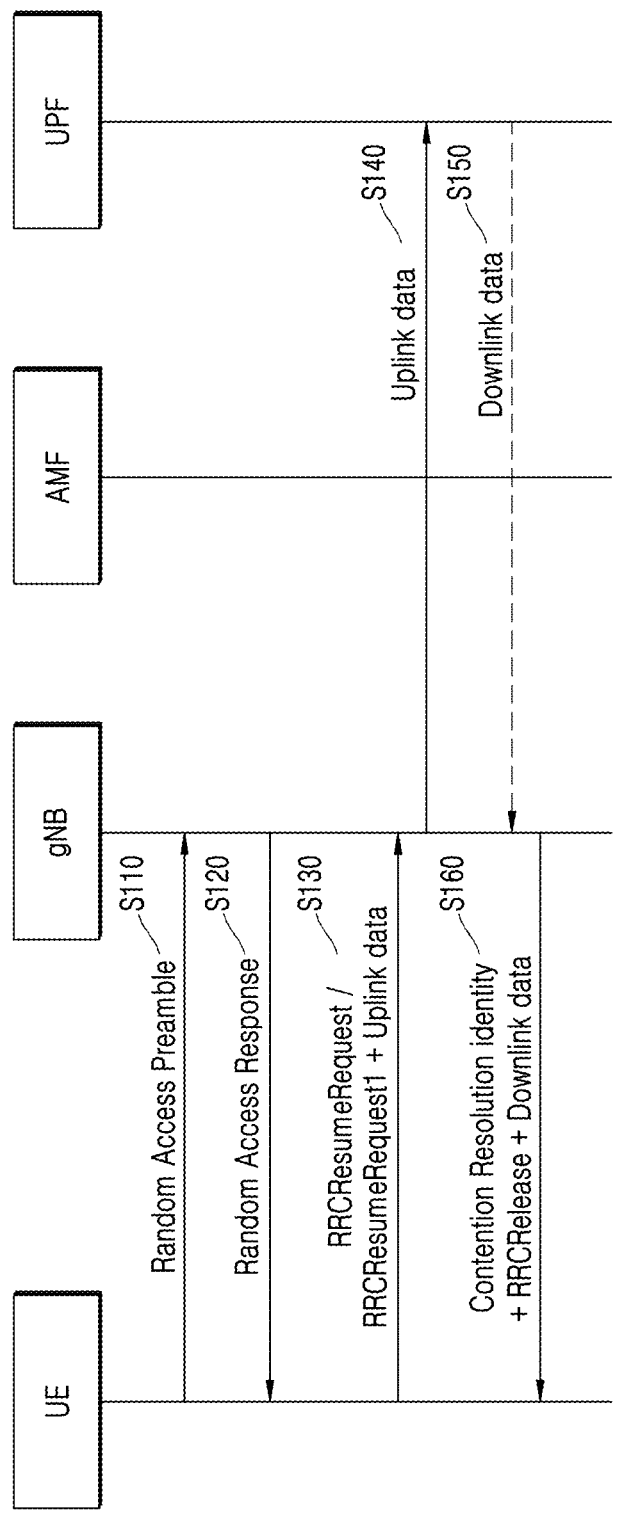
FIG. 1 illustrates an example of signaling flow for a small data transmission using 4 step RA.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system is expected to address are enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using the beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, the higher is the antenna gain and hence the larger the propagation distance of signal transmitted using beamforming. A receiver can also make plurality of receive (RX) beam patterns of different directions. Each of these receive patterns can be also referred as receive (RX) beam.

CA/Multi-connectivity in fifth generation wireless communication system: The fifth generation wireless communication system, supports standalone mode of operation as well dual connectivity (DC). In DC a multiple Rx/Tx UE may be configured to utilise resources provided by two different nodes (or NBs) connected via non-ideal backhaul. One node acts as the Master Node (MN) and the other acts as the Secondary Node (SN). The MN and SN are connected via a network interface and at least the MN is connected to the core network. NR also supports Multi-RAT Dual Connectivity (MR-DC) operation whereby a UE in the RRC_CONNECTED state is configured to utilise radio resources provided by two distinct schedulers, located in two different nodes connected via a non-ideal backhaul and providing either E-UTRA (i.e. if the node is an ng-eNB) or NR access (i.e. if the node is a gNB). In NR for a UE in the RRC_CONNECTED state not configured with CA/DC there is only one serving cell comprising of the primary cell. For a UE in the RRC_CONNECTED state configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

System information acquisition in fifth generation wireless communication system: In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:

the MIB is always transmitted on the BCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes information regarding mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID.

UE acquires SIB 1 from the camped or serving cell. The UE checks the BroadcastStatus bit in SIB 1 for a SI message which UE needs to acquire. SI request configuration for SUL is signaled by gNB using the IE si-RequestConfigSUL in SIB1. If the IE si-RequestConfigSUL is not present in SIB1, UE considers that SI request configuration for SUL is not signaled by gNB. SI request configuration for NUL is signaled by gNB using the IE si-RequestConfig in SIB1. If the IE si-RequestConfig is not present in SIB1, UE considers that SI request configuration for NUL is not signaled by gNB. If a SI message which UE needs to acquire is not being broadcasted (i.e. BroadcastStatus bit is set to zero), UE initiates transmission of a SI request. The procedure for a SI request transmission is as follows:

If the SI request configuration is signaled by a gNB for SUL, and a criteria to select SUL is met (i.e. RSRP derived from SSB measurements of camped or serving cell<rsrp-ThresholdSSB-SUL, where rsrp-ThresholdSSB-SUL is signaled by gNB (e.g. in broadcast signaling such as SIB1)): UE initiates transmission of the SI request based on a Msg1 based SI request on SUL. In other words, UE initiates a Random Access procedure using the PRACH preamble(s) and PRACH resource(s) in the SI request configuration of SUL. UE transmits the Msg1 (i.e. Random access preamble) and waits for acknowledgement for the SI request. Random access resources (PRACH preamble(s) and PRACH occasions(s)) indicated in SI request configuration of SUL is used for the Msg1. The Msg1 is transmitted on SUL. If acknowledgement for the SI request is received, UE monitors the SI window of the requested SI message in one or more SI period(s) of that SI message.

Else if the SI request configuration is signaled by the gNB for NUL and a criteria to select NUL is met (i.e. NUL is selected if SUL is supported in camped or serving cell and RSRP derived from SSB measurements of camped or serving cell>=rsrp-ThresholdSSB-SUL; OR NUL is selected if SUL is not supported in serving cell): UE initiate the transmission of SI request based on a Msg1 based SI request on NUL (350). In other words, UE initiates Random Access procedure using the PRACH preamble(s) and PRACH resource(s) in the SI request configuration of NUL. UE transmits the Msg1 (i.e. Random access preamble) and waits for acknowledgement for SI request. Random access resources (PRACH preamble(s) and PRACH occasions (s)) indicated in the SI request configuration of NUL is used for the Msg1. The Msg1 is transmitted on NUL. If acknowledgement for the SI request is received, UE monitors the SI window of the requested SI message in one or more SI period(s) of that SI message.

Else UE initiate transmission of SI request based on Msg3 based SI request. In other words, UE initiates transmission of RRCSystemInfoRequest message (345). UE transmits the Msg1 (i.e. Random access preamble) and waits for random access response. Common random access resources (PRACH preamble(s) and PRACH occasions(s)) are used for the Msg1. In the UL grant received in random access response, UE transmits RRCSystemInfoRequest message and waits for acknowledgement for SI request (i.e. RRCSystemInfoRequest message). If acknowledgement for a SI request (i.e. RRCSystemInfoRequest message) is received, the UE monitors the SI window of the requested SI message in one or more SI period(s) of that SI message. Note that if SUL is configured, UL carrier for Msg1 transmission will be selected by UE in similar manner as selected by UE for Msg1 based SI request. SUL is the selected UL carrier, if RSRP derived from SSB measurements of camped or serving cell<rsrp-ThresholdSSB-SUL where rsrp-Threshold-SSB-SUL is signaled by the gNB (e.g. in broadcast signaling such as SIB1). NUL is the selected UL carrier, if RSRP derived from SSB measurements of camped or serving cell>=rsrp-ThresholdSSB-SUL where rsrp-ThresholdSSB-SUL is signaled by the gNB (e.g. in broadcast signaling such as SIB1).

PDCCH in fifth generation wireless communication system: In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ information related to downlink shared channel (DL-SCH); Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the Equation 1 below:

$$(y*(\text{number of slots in a radio frame})+x-\text{Monitoring-offset-PDCCH-slot})\bmod(\text{Monitoring-periodicity-PDCCH-slot})=0; \quad \text{[Equation 1]}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. The search space configuration includes the identifier of coreset configuration associated with it. A list of coreset configurations are signaled by GNB for each configured BWP wherein each coreset configuration is uniquely identified by an identifier. For example, each radio frame is of 10 ms duration. The radio frame is identified by a radio frame number or system frame number. Each radio frame comprises several slots wherein the number of slots in a radio frame and duration of slots depends on sub carrier spacing. The number of slots in the radio frame and duration of slots depends on the radio frame for each supported SCS is pre-defined in NR. Each coreset configuration is associated with a list of TCI (Transmission configuration indicator) states. One DL RS ID (SSB or CSI RS) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by GNB for transmission of PDCCH in the PDCCH monitoring occasions of a search space.

BWP operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In the RRC connected state, the UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

Random access in fifth generation wireless communication system: In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by a non-synchronized UE in the RRC CONNECTED state. Several types of random access procedure is supported.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+ 14*80*8*ul_carrier_id, where s_id is the index of the first orthogonal frequency division multiplexing (OFDM) symbol of the PRACH occasion where UE has transmitted Msg1, i.e. RA preamble; $0 \leq s\_id < 14$; t_id is the index of the first slot of the PRACH occasion ($0 \leq t\_id < 80$); fid is the index of the PRACH occasion within the slot in the frequency domain ($0 \leq f\_id < 8$), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for secondary cell (Scell), etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs) are provided by gNB, UE select non dedicated preamble. Otherwise UE select dedicated preamble. So during the RA procedure, one random access attempt can be CFRA while other random access attempt can be CBRA.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. Next generation node B (gNB) transmits the MsgB on physical downlink shared channel (PDSCH). PDCCH scheduling the PDSCH carrying MsgB is addressed to MsgB-radio network temporary identifier (MSGB-RNTI). MSGB-RNTI identifies the time-frequency resource (also referred as physical RA channel (PRACH) occasion or PRACH transmission (TX) occasion or RA channel (RACH) occasion) in which RA preamble was detected by gNB. The MSGB-RNTI is calculated as follows: RA-RNTI=1+s_id+ 14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); fid is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. The response is also referred as MsgB.

Next generation node B (gNB) transmits the MsgB on physical downlink shared channel (PDSCH). PDCCH scheduling the PDSCH carrying MsgB is addressed to MsgB-radio network temporary identifier (MSGB-RNTI). MSGB-RNTI identifies the time-frequency resource (also referred as physical RA channel (PRACH) occasion or PRACH transmission (TX) occasion or RA channel (RACH) occasion) in which RA preamble was detected by gNB. The MSGB-RNTI is calculated as follows: RA-RNTI=1+s_id+ 14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); fid is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs/PUSCH resources) are provided by gNB, UE select non dedicated preamble. Otherwise UE select dedicated preamble. So during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signalled by gNB, UE select the signalled carrier for performing Random Access procedure. If the carrier to use for the Random Access procedure is not explicitly signalled by gNB; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise UE selects 2 step RACH.

Paging in fifth generation wireless communication system: In the 5th generation (also referred as NR or New Radio) wireless communication system UE can be in one of the following RRC state: RRC IDLE, RRC_INACTIVE and RRC_CONNECTED. The RRC states can further be characterized as follows:

In the RRC_IDLE state, a UE specific DRX may be configured by upper layers (i.e. NAS). The UE, monitors Short Messages transmitted with P-RNTI over DCI; Monitors a Paging channel for CN paging using 5G-S-TMSI;

Performs neighbouring cell measurements and cell (re-) selection; Acquires system information and can send SI request (if configured).

In the RRC_INACTIVE state, a UE specific DRX may be configured by upper layers or by RRC layer; In this state, UE stores the UE Inactive AS context. A RAN-based notification area is configured by RRC layer. The UE monitors Short Messages transmitted with P-RNTI over DCI; The UE monitors a Paging channel for CN paging using 5G-S-TMSI and RAN paging using full-RNTI; The UE performs neighbouring cell measurements and cell (re-)selection; The UE performs RAN-based notification area updates periodically and when moving outside the configured RAN-based notification area; The UE acquires system information and can send SI request (if configured).

In the RRC_CONNECTED state, the UE stores the AS context. Unicast data is transmitted/received to/from UE. At lower layers, the UE may be configured with a UE specific DRX.

The UE, monitors Short Messages transmitted with P-RNTI over DCI, if configured; Monitors control channels associated with the shared data channel to determine if data is scheduled for it; Provides channel quality and feedback information; The UE performs neighbouring cell measurements and measurement reporting; Acquires system information.

The 5G or Next Generation Radio Access Network (NG-RAN) based on NR consists of NG-RAN nodes where NG-RAN node is a gNB, providing NR user plane and control plane protocol terminations towards the UE. The gNBs are also connected by means of the NG interfaces to the 5GC, more specifically to the AMF (Access and Mobility Management Function) by means of the NG-C interface and to the UPF (User Plane Function) by means of the NG-U interface. In the 5th generation (also referred as NR or New Radio) wireless communication system, the UE may use Discontinuous Reception (DRX) in RRC_IDLE and RRC_INACTIVE state in order to reduce power consumption. In the RRC_IDLE/RRC_INACTIVE state the UE wake up at regular intervals (i.e. every DRX cycle) for short periods to receive paging, to receive SI update notification and to receive emergency notifications. A paging message is transmitted using physical downlink shared channel (PDSCH). A physical downlink common control channel (PDCCH) is addressed to P-RNTI if there is a paging message in PDSCH. P-RNTI is common for all UEs. A UE identity (i.e. S-TMSI for RRC_IDLE UE or I-RNTI for RRC_INACTIVE UE) is included in paging message to indicate paging for a specific UE. The Paging message may include multiple UE identities to page multiple UEs. The paging message is broadcasted (i.e. PDCCH is masked with P-RNTI) over data channel (i.e. PDSCH). SI update and emergency notifications are included in DCI and PDCCH carrying this DCI is addressed to P-RNTI. In the RRC idle/inactive mode, the UE monitors one paging occasion (PO) every DRX cycle. In the RRC idle/inactive mode, the UE monitors PO in initial DL BWP. In the RRC connected state, the UE monitors one or more POs to receive a SI update notification and to receive an emergency notification. In the RRC connected state, the UE can monitor any PO in a paging DRX cycle and monitors at least one PO in a SI modification period. In the RRC idle/inactive mode, the UE monitors PO every DRX cycle in its active DL BWP. A PO is a set of 'S' PDCCH monitoring occasions for paging, where 'S' is the number of transmitted SSBs (i.e. the Synchronization Signal and PBCH block (SSB) consists of primary and secondary synchronization signals (PSS, SSS) and PBCH) in cell. The UE first determines the paging frame (PF) and then determines the PO with respect to the determined PF. One PF is a radio frame (10 ms).

The PF for a UE is the radio frame with system frame number 'SFN' which satisfies the equation (SFN+ PF_offset) mod T=(T div N)*(UE_ID mod N).

Index (i_s), indicating the index of the PO is determined by i_s=floor(UE_ID/N) mod Ns.

T is DRX cycle of the UE.

In the RRC_INACTIVE state, T is determined by the shortest of the UE specific DRX value configured by RRC, the UE specific DRX value configured by NAS, and a default DRX value broadcast in system information.

In the RRC_IDLE state, T is determined by the shortest of the UE specific DRX value configured by NAS, and a default DRX value broadcast in system information. If the UE specific DRX value is not configured by upper layers (i.e. NAS), the default value is applied.

N: number of total paging frames in T
Ns: number of paging occasions for a PF
PF_offset: offset used for PF determination
UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset as defined in TS 38.331. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by the gNB.

When SearchSpaceId=0 is configured for paging-SearchSpace, the PDCCH monitoring occasions for paging are same as for RMSI as defined in clause 13 in TS 38.213. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (i_s+1)th PO. The PDCCH monitoring occasions for paging are determined based on paging search space configuration (paging-SearchSpace) signaled by the gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the (i_s+1)th PO is a set of 'S' consecutive PDCCH monitoring occasions for paging starting from the PDCCH monitoring occasion number indicated by firstPDCCH-MonitoringOccasionOfPO (i.e. the (i_s+1)th value of the firstPDCCH-MonitoringOccasionOfPO parameter). Otherwise, the (i_s+1)th PO is a set of 'S' consecutive PDCCH monitoring occasions for paging starting from the (i_s*S)th PDCCH monitoring occasion for paging. 'S' is the number of actual transmitted SSBs determined according to parameter ssb-PositionsInBurst signalled in SystemInformationBlock1 received from gNB. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

The PDCCH addressed to P-RNTI carries information according to DCI format 1_0. The following information is transmitted by means of the DCI format 1_0 with CRC scrambled by P-RNTI:

Short Messages Indicator—2 bits according to Table 1.

Short Messages—8 bits according to Table 2. If only the scheduling information for Paging is carried, this bit field is reserved.

Frequency domain resource assignment—$\lceil \log_2(N_{RB}^{DL,BWP}(N_{RB}^{DL,BWP}+1)/2) \rceil$ bits. If only the short message is carried, this bit field is reserved.

$N_{RB}^{DL,BWP}$ is the size of CORESET 0

Time domain resource assignment—4 bits as defined in Subclause 5.1.2.1 of [6, TS38.214]. If only the short message is carried, this bit field is reserved.

VRB-to-PRB mapping—1 bit according to Table 7.3.1.1.2-33. If only the short message is carried, this bit field is reserved.

Modulation and coding scheme—5 bits as defined in Subclause 5.1.3 of [6, TS38.214], using Table 5.1.3.1-1. If only the short message is carried, this bit field is reserved.

TB scaling—2 bits as defined in Subclause 5.1.3.2 of [6, TS38.214]. If only the short message is carried, this bit field is reserved.

Reserved bits—6 bits

TABLE 1

Short Message indicator

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

Table 2 defines Short Message. Bit 1 is the most significant bit.

TABLE 2

Short Message

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Reserved |

Small data transmission in fifth generation wireless communication system: In 5G wireless communication system, a small data transmission (SDT) in the RRC_INACTIVE is supported. The uplink data can be transmitted in Msg3 in case of 4 step RA procedure and in MsgA in case of 2 step RA procedure. FIG. 1 illustrates an example of signaling flow for the small data transmission using 4 step RA.

In case that a criteria to initiate 4 step RA for SDT is met, the UE selects preamble/RO from preambles/ROs for SDT. The UE transmits random access preamble (S110) and receives RAR including a UL grant for Msg3 transmission (S120).

The UE sends an RRCResumeRequest/RRCResumeRequest1 to the gNB (same as the last serving GNB) on SRB 0 (S130). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (NIA or EIA) in the stored AS security context, which was negotiated between the UE and the last serving gNB and the $K_{RRCint}$ from the stored AS security context with the following inputs:

KEY: it shall be set to current $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE resumes SRB(s) and DRB(s), derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH/CCCH1.

The gNB validates the resumeMAC-I and delivers the uplink data to UPF (S140).

The gNB sends the RRCRelease message to keep the UE in the RRC_INACTIVE state. PDCCH is addressed to TC-RNTI. If downlink data is available (S150), they are sent ciphered and integrity protected (Only for DRBs configured with UP integrity protection) on DTCH multiplexed with the RRCRelease message on DCCH (S160). The gNB may decide not to send the RRCRelease message together with contention Resolution Identity. In this case upon completion of random access, the UE monitors PDCCH addressed to C-RNTI. UL/DL data can be exchanged between the UE and the gNB until RRCRelease message is received or SDT procedure is terminated.

Figure 2:
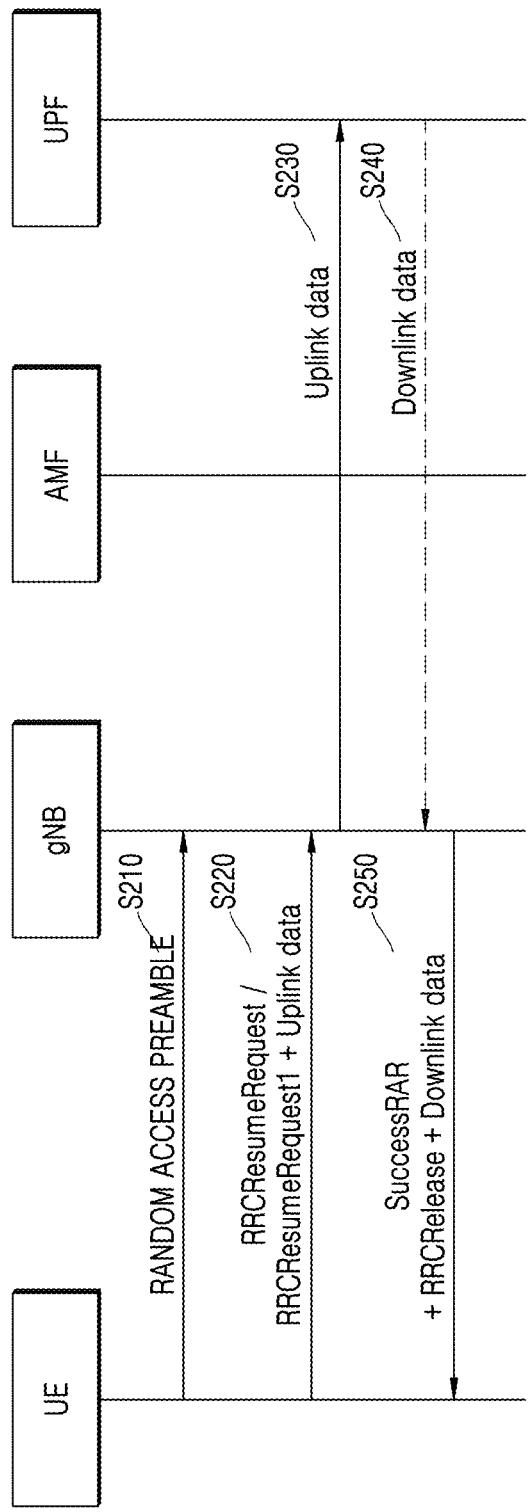
FIG. 2 illustrates an example of signaling flow for small data transmission using 2 step RA.

FIG. 2 illustrates an example of signaling flow for small data transmission using 2 step RA.

In case that a criteria to initiate the 2 step RA for SDT is met, The UE selects preamble/RO/PO from preambles/ROs/POs for SDT. The UE transmits random access preamble (S210).

In the MsgA payload, the UE sends an RRCResumeRequest/RRCResumeRequest1 to the gNB (same as the last serving GNB) on SRB 0 (S220). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (NIA or EIA) in the stored AS security context, which was negotiated between the UE and the last serving gNB and the $K_{RRCint}$ from the stored AS security context with the following inputs:

KEY: it shall be set to current $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE resumes all SRBs and DRBs, derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH/CCCH1.

The gNB validates the resumeMAC-I and delivers the uplink data to UPF (S230).

The gNB sends the RRCRelease message to keep the UE in the RRC_INACTIVE state in MsgB along with successRAR. PDCCH is addressed to C-RNTI. If downlink data is available (S240), they are sent ciphered and integrity protected (Only for DRBs configured with UP integrity protection) on DTCH multiplexed with the RRCRelease message on DCCH (S250). The gNB may decide not to send the RRCRelease message together with successRAR. In this case upon completion of random access, the UE monitors PDCCH addressed to C-RNTI. UL/DL data can be exchanged between the UE and the gNB until RRCRelease message is received or SDT procedure is terminated.

Figure 3:
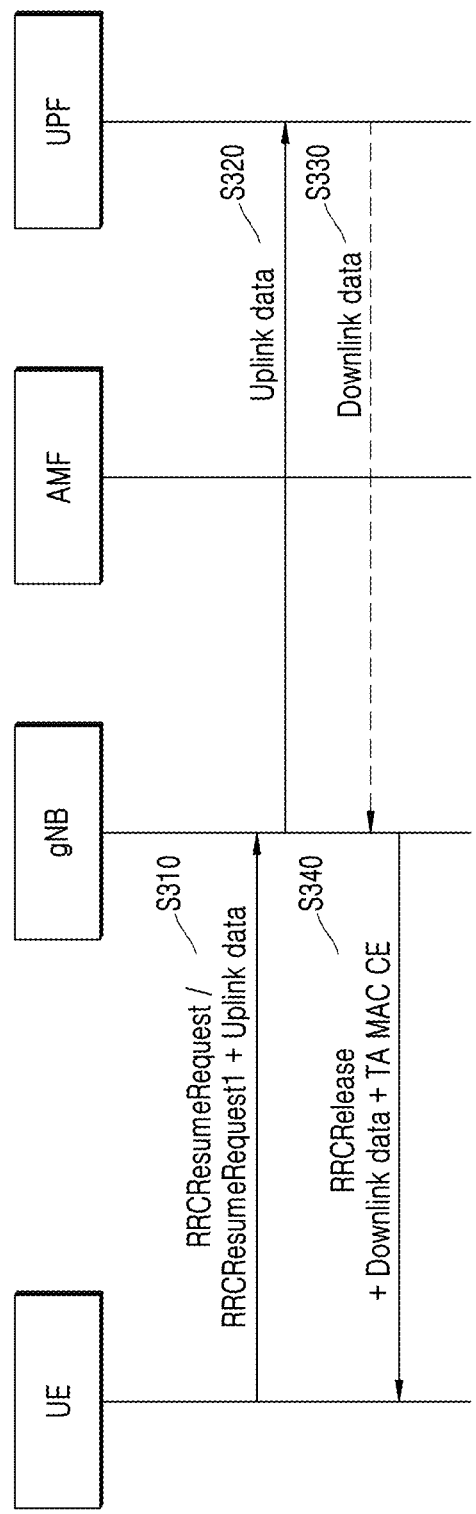
FIG. 3 illustrates an example of signaling flow for small data transmission using preconfigured PUSCH resource.

FIG. 3 illustrates an example of signaling flow for small data transmission using preconfigured PUSCH resource.

In case that a criteria to initiate SDT using preconfigured PUSCH resources is met, in the preconfigured PUSCH resource, the UE sends an RRCResumeRequest/RRCResumeRequest1 to the gNB (same as the last serving GNB) on SRB 0 (S310). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (NIA or EIA) in the stored AS security context, which was negotiated between the UE and the last serving gNB and the $K_{RRCint}$ from the stored AS security context with the following inputs:

KEY: it shall be set to current $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input with following inputs:

source PCI (set to the physical cell identity of the PCell the UE was connected to prior to suspension of the RRC connection)

target Cell-ID (Set to the cellIdentity of the first PLMN-Identity included in the PLMN-IdentityInfoList broadcasted in SIB1 of the target cell i.e. the cell to which the UE is sending small data)

source C-RNTI (Set to C-RNTI that the UE had in the PCell it was connected to prior to suspension of the RRC connection).

The UE resumes all SRBs and DRBs, derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH.

The UE can alternately transmit its small data by using one of the following options:

RRCResumeRequest (or new RRC message). resumeIdentity, ResumeMAC-I, resumeCause, NAS container in RRCResumeRequest/RRCResumeRequest1. NAS container includes UL data.

new MAC CE (resumeIdentity, ResumeMAC-I)+uplink data (on DTCH). resumeIdentity is provided for UE identification purpose. ResumeMAC-I is for security the gNB validates the resumeMAC-I and delivers the uplink data to UPF (S320).

The gNB sends the RRCRelease message to keep the UE in the RRC_INACTIVE state. The PDCCH is addressed to C-RNTI. The C-RNTI is the one which the UE used in cell from which it received preconfigured PUSCH resources. Alternately, the C-RNTI can be assigned along with preconfigured PUSCH resources. If downlink data is available (S330), they are sent ciphered and integrity protected (Only for DRBs configured with UP integrity protection) on DTCH multiplexed with the RRCRelease message on DCCH (S340).

We can consider an alternate signaling flow wherein gNB can schedule UL grant (PDCCH addressed to C-RNTI) before RRCRelease. In the UL transmission the UE can indicate if it has more data to transmit. If the UE has more data to transmit, gNB can schedule UL grant. Otherwise RRCRelease. In the UL transmission, the UE can also include SSB ID(s) of SSB above threshold if the SSB indicated by PRACH preamble is no longer suitable.

Alternatively, the gNB can transmit PDCCH addressed to RNTI (i.e. RNTI is the one assigned by gNB along with preconfigured resource, it can be assigned to other UEs as well) and scheduled DL TB includes contention resolution identity (it is first X bits (e.g. 48 bits) of resume message) and C-RNTI. If it matches with the UE's contention resolution identity, the UE stops the monitoring timer and the UE can consider small data transmission as successful.

In the response of the small data transmission, the UE can receive a signal (RRC message or DCI) for the following purpose: releasing pre-configured PUSCH or switching to Resume procedure (i.e. RRC_CONNECTED).

In the RRC_INACTIVE state, when data arrives for one or more DRBs, the UE checks whether SDT criteria is met (RSRP threshold, data volume threshold, etc) or not. If SDT criteria is met, SDT procedure is initiated. The UE transmits RRCResumeRequest+UL data in SDT resource (i.e. Msg3/MsgA/CG resource). A BSR may also be included. In case of RA-SDT, upon completion of RA, the UE monitors for PDCCH addressed to C-RNTI for subsequent data transmission/reception. In case of CG-SDT, upon transmitting a RRCResumeRequest in CG resource, the UE monitors for PDCCH addressed to SDT-RNTI for subsequent data transmission/reception. The SDT procedure is completed upon receiving a RRCRelease message from the gNB.

The issue is how to handle a paging monitoring for receiving SI update notifications, emergency notifications and paging message during the SDT procedure. In the RRC_IDLE and RRC_INACTIVE, the UE is provided with common search space, including pagingSearchSpace, searchSpaceSIB1 and searchSpaceOtherSystemInformation, on the initial DL BWP for paging and SI reception. The Monitoring paging during SDT procedure can lead to unnecessary power consumption. On the other hand, skipping paging monitoring may lead to missing of SI update and emergency notifications. Another issue is how to handle SI request during the SDT procedure.

Embodiment 1

In one embodiment of the disclosure, the UE may perform the paging operation in the RRC_INACTIVE state as follows:

The UE is in the RRC_INACTIVE state

The UE may follow Paging Monitoring Behavior 1 as explained below (this operation is performed while SDT procedure is not ongoing)

The UE may monitor for a System information modification notification (i.e. SystemInfoModification) and an emergency notification (i.e. etwsAndCmasIndication) in its own paging occasion of every DRX cycle (T). The UE may monitor for a paging indication in its own paging occasion of every DRX cycle (T). The UE may monitor for short message in its own paging occasion of every DRX cycle (T). The UE's paging occasion is determined as explained earlier in the background.

If an early paging indication is not supported in the camped cell, the UE monitors a PDCCH addressed to a P-RNTI in its paging occasion of every DRX cycle (T).

If the early paging indication is supported in the camped cell, the UE monitors early paging indication before its paging occasion of every DRX cycle (T). The early paging indication is a sequence or a PDCCH transmitted before the paging occasion. If indication by early paging indication (or early paging indication indicates the UE to monitor its paging occasion), the UE monitors the PDCCH addressed to the P-RNTI in its paging occasion.

The DRX cycle length is determined by the shortest of the UE specific DRX value configured by RRC, the UE specific DRX value configured by NAS, and a default DRX cycle value broadcast in system information Data arrives for one or more RB(s) and criteria to initiate SDT procedure (RSRP threshold, data volume threshold, etc.) is met in RRC_INACTIVE state, the UE select one of a RA-SDT procedure or a CG-SDT procedure.

If the RA-SDT is selected (or If the RA-SDT is selected and initial DL BWP is used for receiving DL from gNB, note that there can be an initial DL BWP and an redcap (reduced capability) initial DL BWP configured in camped cell):

Upon completion of the random access procedure (criteria for completion of random access procedure are as explained earlier in the background) initiated for the SDT, the UE may follow Paging Monitoring Behavior 2 as explained below:

The UE may monitor for a System information modification notification (i.e. SystemInfoModification) in any paging occasion at least once per SI modification period (or modification period). The length of SI modification period is in multiple of length of default DRX cycle. The length of SI modification period is received from the gNB in system information. The SI modification period boundaries are defined by SFN values for which SFN mod m=0, where the m is the number of radio frames comprising the SI modification period. The UE may monitor for an emergency notification (i.e. etwsAndCmasIndication) in any paging occasion at least once per default DRX cycle. The length of default DRX cycle is received from the gNB in system information.

In an embodiment, the UE may monitor a PDCCH addressed to a P-RNTI in any paging occasion at least once per SI modification period for a System information modification notification. In an embodiment, the UE may monitor the PDCCH addressed to the P-RNTI in any paging occasion at least once per default DRX cycle for an emergency notification. Alternately, the UE may monitor the PDCCH addressed to the P-RNTI in any paging occasion at least once per default DRX cycle for the System information modification notification and the emergency notifications.

In an embodiment, if early paging indication is supported and the early paging indication supports short message or SI update notification, the UE may monitor the early paging indication before any paging occasion at least once per SI modification period. In an embodiment, if the early paging indication is supported and the early paging indication supports the emergency notification, the UE may monitors the early paging indication before any paging occasion at least once per default DRX cycle. In an embodiment, if the early paging indication is supported and the early paging indication supports the emergency notification and the SI update notification, the UE may monitor the early paging indication before any paging occasion at least once per default DRX cycle. The UE may does not monitor the PDCCH addressed to the P-RNTI in any paging occasion.

In an embodiment, if the early paging indication is supported and the early paging indication does not support short message or SI update notification/emergency notifications, the UE may monitor the early paging indication before any paging occasion at least once per SI modification period. In an embodiment, if the early paging indication is supported and the early paging indication does not support the short message or the SI update notification/emergency notifications, the UE may monitor the early paging indication before any paging occasion at least once per default DRX cycle. If an indication by the early paging indication (or the early paging indication indicates the UE to monitor its paging occasion), the UE may monitor the PDCCH addressed to the P-RNTI in the paging occasion.

The UE may not monitor for paging indication (i.e. the UE ignores the scheduled information for paging message in paging DCI i.e. DCI received in PDCCH addressed to P-RNTI in the monitored paging occasion)

Else if the CG SDT is selected (or If the CG SDT is selected and initial DL BWP is used for receiving DL from gNB, note that there can be an initial DL BWP and an redcap (reduced capability) initial DL BWP configured in camped cell):

Upon receiving the acknowledgment (e.g. HARQ feedback, RLC ACK) for first UL packet transmitted in CG resource during the SDT procedure, the UE may follow Paging Monitoring Behavior 2 as explained below; or Upon receiving the first PDCCH addressed to C-RNTI (or SDT-RNTI) (This PDCCH may schedule new DL TB or new UL transmission for a HARQ process (HARQ process can be same as the HARQ process used for transmitting first UL packet or can be a different HARQ process)), the UE may follow Paging Monitoring Behavior 2 as explained below The UE may monitor for a System information modification notification (i.e. SystemInfoModification) in any paging occasion at least once per a SI modification period (or modification period). The length of the SI modification period is in multiple of length of default DRX cycle. The length of SI modification period is received from the gNB in system information. The SI modification period boundaries are defined by SFN values for which SFN mod m=0, where the m is the number of radio frames comprising the SI modification period. The UE may monitor for an emergency notification (i.e. etwsAndCmasIndication) in any paging occasion at least once per default DRX cycle. The length of default DRX cycle is received from the gNB in system information.

In an embodiment, the UE may monitor a PDCCH addressed to a P-RNTI in any paging occasion at least once per SI modification period for System information modification notification. In an embodiment, the UE may monitor the PDCCH addressed to the P-RNTI in any paging occasion at least once per default DRX cycle for an emergency notification. Alternately, the UE may monitor the PDCCH addressed to the P-RNTI in any paging occasion at least once per default DRX cycle for the System information modification notification and the emergency notifications.

In an embodiment, if early paging indication is supported and the early paging indication supports short message or SI update notification, the UE may monitor the early paging indication before any paging occasion at least once per SI modification period. In an embodiment, if the early paging indication is supported and the early paging indication supports the emergency notification, the UE may monitor the early paging indication before any paging occasion at least once per default DRX cycle. In an embodiment, if the early paging indication is supported and the early paging indication supports the emergency notification and the SI update notification, the UE may monitor the early paging indication before any paging occasion at least once per default DRX cycle. The UE may does not monitor the PDCCH addressed to the P-RNTI in any paging occasion.

In an embodiment, if the early paging indication is supported and the early paging indication does not support short message or SI update notification/emergency notifications, the UE may monitor the early paging indication before any paging occasion at least once per SI modification period. In an embodiment, if the early paging indication is supported and the early paging indication does not support the short message or the SI update notification/emergency notifications, the UE may monitor the early paging indication before any paging occasion at least once per default DRX cycle. If an indication by the early paging indication (or the early paging indication indicates the UE to monitor its paging occasion), the UE may monitor the PDCCH addressed to the P-RNTI in the paging occasion.

The UE may not monitor for paging indication (i.e. UE ignores the scheduled information for paging message in paging DCI i.e. DCI received in the PDCCH addressed to the P-RNTI in the monitored paging occasion)

When the SDT procedure is terminated/completed, the UE may follow Paging Monitoring Behavior 1 as explained below. The SDT procedure is terminated/completed in following cases: integrity check being failed for the packet received from the gNB, receiving RRCSetup message at the UE from the gNB during the SDT procedure, receiving RRCRelease at the UE from the gNB during the SDT procedure, cell reselection occurrence during the SDT procedure, receiving RRCReject at the UE from the gNB during the SDT procedure, etc.

The UE may monitor the System information modification notification (i.e. SystemInfoModification) and the emergency notification (i.e. etwsAndCmasIndication) in its own paging occasion of every DRX cycle (T). The UE may monitor for paging indication in its own paging occasion of every DRX cycle (T). The UE may monitor the short message in its own paging occasion of every DRX cycle (T). The UE's paging occasion is determined as explained earlier in the background.

If early paging indication is not supported in the camped cell, the UE may monitor the PDCCH addressed to the P-RNTI in its paging occasion of every DRX cycle.

If early paging indication is supported in the camped cell, the UE may monitor the early paging indication before its paging occasion of every DRX cycle. The early paging indication is a sequence or the PDCCH transmitted before the paging occasion. If an indication by the early paging indication (or early paging indication indicates UE to monitor its paging occasion), UE may monitor the PDCCH addressed to the P-RNTI in its paging occasion.

The DRX cycle length is determined by the shortest of the UE specific DRX value configured by RRC, the UE specific DRX value configured by NAS, and a default DRX cycle value broadcasted in system information.

Figure 4:
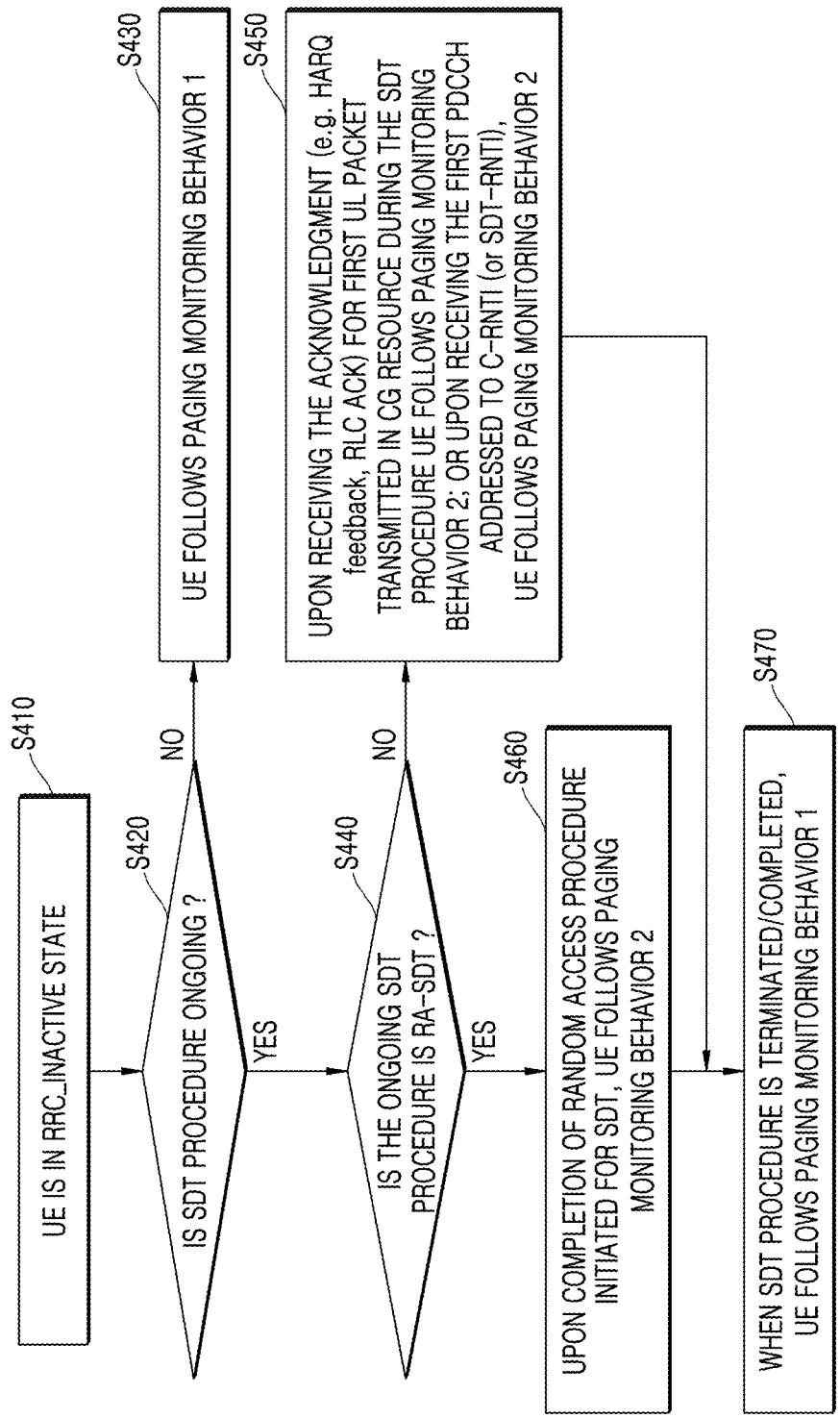
FIG. 4 illustrates a flow chart of an operation by the UE in an RRC_INACTIVE for selecting between a first paging monitoring behavior and a second paging monitoring behavior according to the embodiment in the disclosure.

FIG. 4 illustrates a flow chart of an operation by the UE in the RRC_INACTIVE state for selecting between a first paging monitoring behavior and a second paging monitoring behavior according to the embodiment in the disclosure.

In step S410, the UE is in a RRC_INACTIVE state.

In step S420, the UE determines whether the SDT procedure is ongoing.

In step S430, the UE may follow the first paging monitoring behavior (Paging Monitoring Behavior 1), in case that the SDT procedure is not ongoing.

In step S440, the UE may determine whether the ongoing SDT procedure is a RA-SDT procedure.

In step S450, upon receiving the acknowledgement (e.g. HARQ feedback, RLC ACK) for a first UL packet transmitted in a CG resource during the SDT procedure or upon receiving first PDCCH addressed to C-RNTI/SDT-RNTI (This PDCCH may schedule new DL TB or new UL transmission for a HARQ process (HARQ process can be same as the HARQ process used for transmitting first UL packet or can be a different HARQ process)), the UE may follow the second paging monitoring behavior (Paging Monitoring Behavior 2), in case that the ongoing SDT procedure is not the RA-SDT. In step S460, upon completion of a random access procedure initiated for the SDT, the UE may follow the second paging monitoring behavior (Paging Monitoring Behavior 2), in case that the ongoing SDT procedure is the RA-SDT.

In step S470, when the SDT procedure is terminated or completed, the UE may follow the first paging monitoring behavior (Paging Monitoring Behavior 1).

Figure 5:
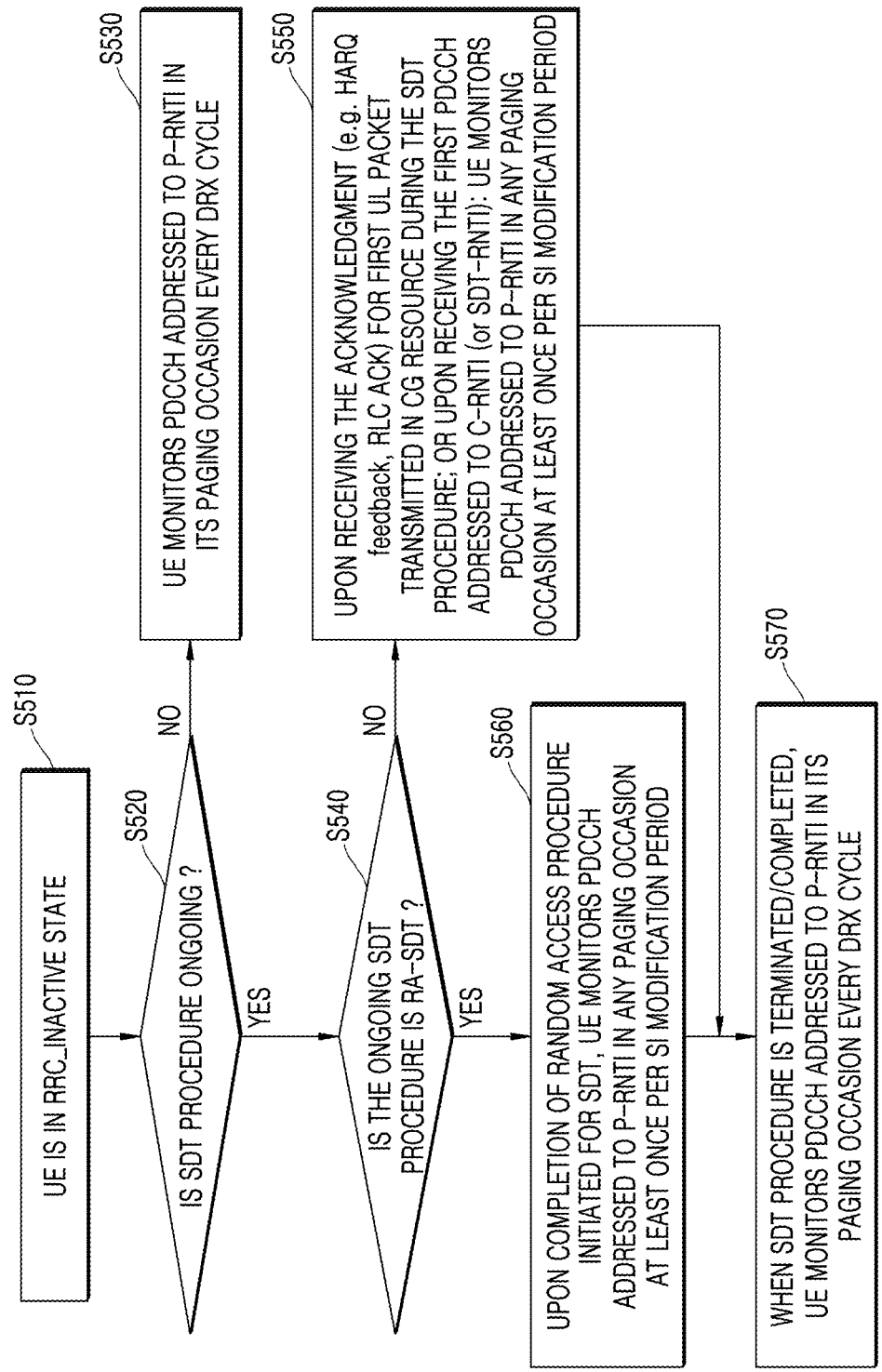
FIG. 5 illustrates a flow chart of an operation by the UE in an RRC_INACTIVE state for monitoring PDCCH addressed to P-RNTI in paging occasion according to the embodiment in the disclosure.

FIG. 5 illustrates a flow chart of an operation by the UE in the RRC_INACTIVE state for monitoring PDCCH addressed to P-RNTI in paging occasion according to the embodiment in the disclosure.

In step S510, the UE is in a RRC_INACTIVE state.

In step S520, the UE determines whether the SDT procedure is ongoing.

In step S530, the UE may monitor a PDCCH addressed to a P-RNTI in its paging occasion of every DRX cycle, in case that the SDT procedure is not ongoing.

In step S540, the UE may determine whether the ongoing SDT procedure is a RA-SDT procedure.

In step S550, upon receiving the acknowledgement (e.g. HARQ feedback, RLC ACK) for a first UL packet transmitted in a CG resource during the SDT procedure or upon receiving a first PDCCH addressed to a C-RNTI (or SDT-RNTI) (This PDCCH may schedule new DL TB or new UL transmission for a HARQ process (HARQ process can be same as the HARQ process used for transmitting first UL packet or can be a different HARQ process)), the UE may monitor the PDCCH addressed to P-RNTI in any paging occasion at least once per SI modification period, in case that the ongoing SDT procedure is not the RA-SDT.

In step S560, upon completion of a random access procedure initiated for the SDT, the UE may monitor the PDCCH addressed to the P-RNTI in any paging occasion at least once per the SI modification period, in case that the ongoing SDT procedure is the RA-SDT.

In step S570, when the SDT procedure is terminated or completed, the UE may monitor the PDCCH addressed to the P-RNTI in its paging occasion of every DRX cycle.

Figure 6:
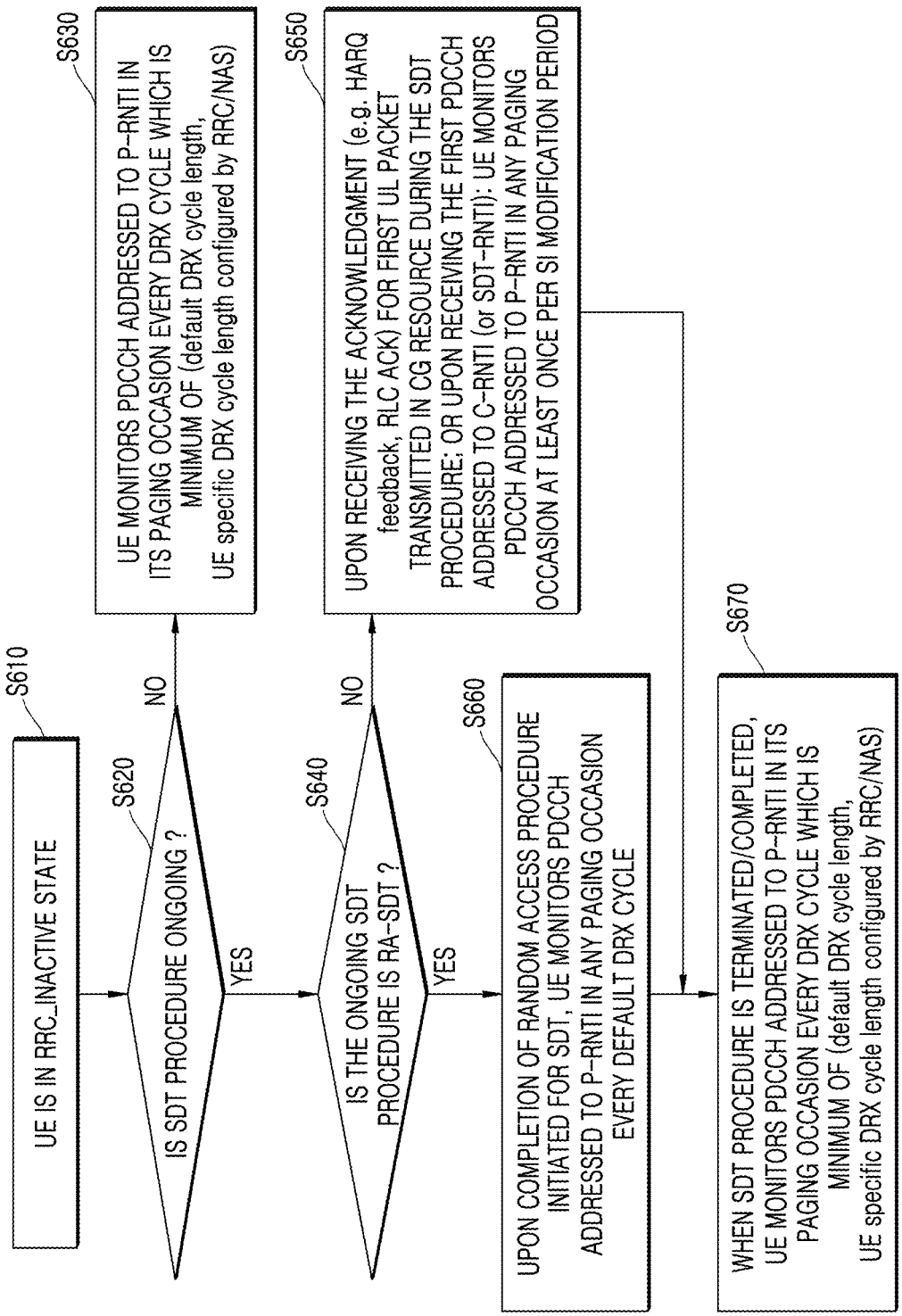
FIG. 6 illustrates a flow chart of an operation by the UE in an RRC_INACTIVE state for monitoring PDCCH addressed to P-RNTI in paging occasion according to the embodiment in the disclosure.

FIG. 6 illustrates a flow chart of an operation by the UE in the RRC_INACTIVE state for monitoring PDCCH addressed to P-RNTI in paging occasion according to the embodiment in the disclosure.

In step S610, the UE is in a RRC_INACTIVE state.

In step S620, the UE determines whether the SDT procedure is ongoing.

In step S630, the UE may monitor a PDCCH addressed to a P-RNTI in its paging occasion of every DRX cycle (T) which is minimum among a default DRX cycle length and a UE specific DRX cycled length configured by RRC/NAS as explained earlier, in case that the SDT procedure is not ongoing.

In step S640, the UE may determine whether the ongoing SDT procedure is a RA-SDT procedure.

In step S650, upon receiving the acknowledgement (e.g. HARQ feedback, RLC ACK) for a first UL packet transmitted in a CG resource during the SDT procedure or upon receiving a first PDCCH addressed to a C-RNTI (or SDT-RNTI) (This PDCCH may schedule new DL TB or new UL transmission for a HARQ process (HARQ process can be same as the HARQ process used for transmitting first UL packet or can be a different HARQ process)), the UE may monitor the PDCCH addressed to P-RNTI in any paging occasion at least once per SI modification period, in case that the ongoing SDT procedure is not the RA-SDT.

In step S660, upon completion of a random access procedure initiated for the SDT, the UE may monitor the PDCCH addressed to the P-RNTI in any paging occasion every default DRX cycle, in case that the ongoing SDT procedure is the RA-SDT.

In step S670, when the SDT procedure is terminated or completed, the UE may monitor the PDCCH addressed to the P-RNTI in its paging occasion of every DRX cycle (T) which is minimum among a default DRX cycle length and a UE specific DRX cycled length configured by RRC/NAS as explained earlier.

Figure 7:
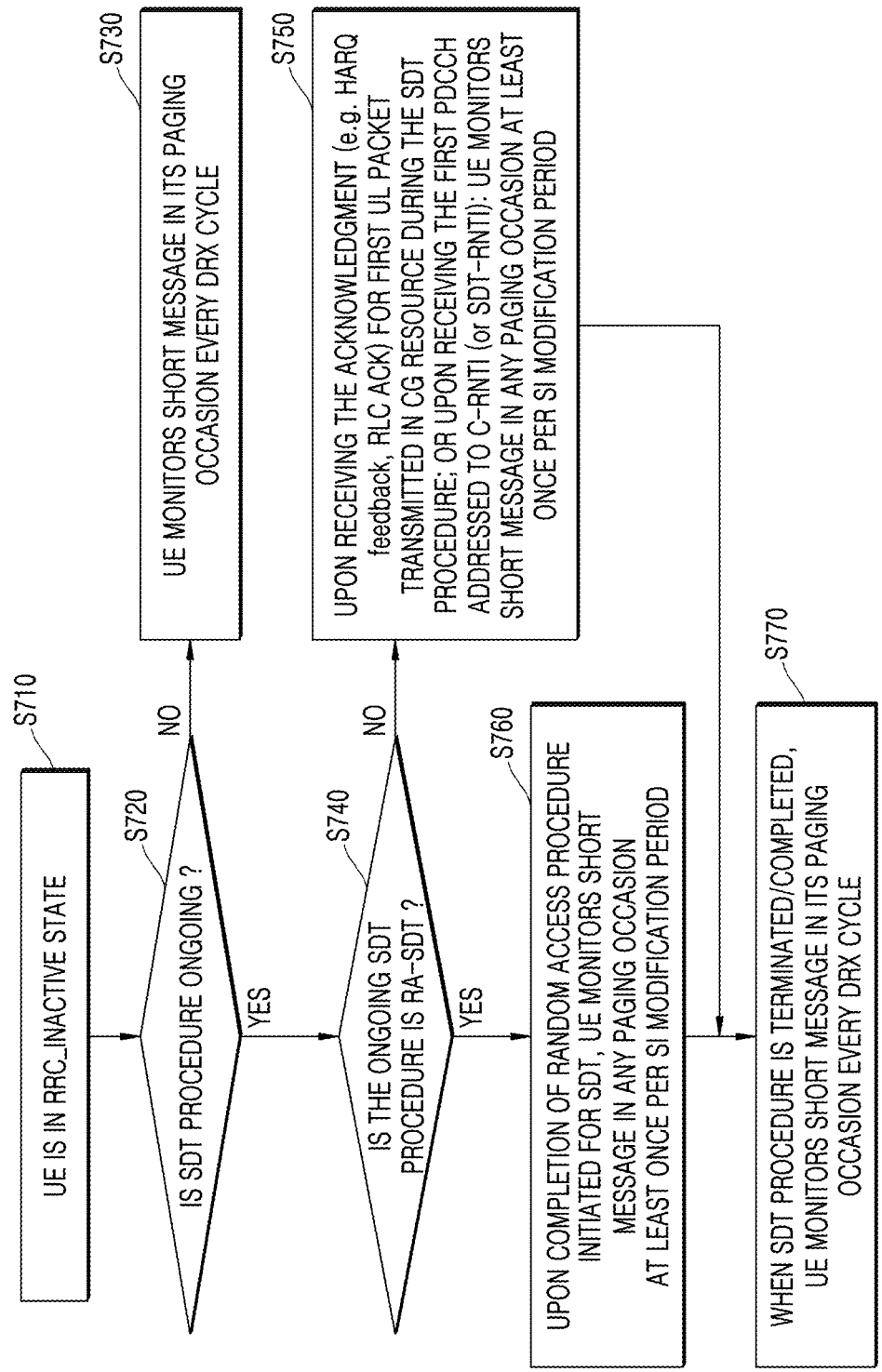
FIG. 7 illustrates a flow chart of an operation by the UE in an RRC_INACTIVE state for monitoring short message in paging occasion according to the embodiment in the disclosure.

FIG. 7 illustrates a flow chart of an operation by the UE in the RRC_INACTIVE state for monitoring short message in paging occasion according to the embodiment in the disclosure.

In step S710, the UE is in a RRC_INACTIVE state.

In step S720, the UE determines whether the SDT procedure is ongoing.

In step S730, the UE may monitor a short message in its paging occasion of every DRX cycle (T), in case that the SDT procedure is not ongoing.

In step S740, the UE may determine whether the ongoing SDT procedure is a RA-SDT procedure.

In step S750, upon receiving the acknowledgement (e.g. HARQ feedback, RLC ACK) for a first UL packet transmitted in a CG resource during the SDT procedure or upon receiving a first PDCCH addressed to a C-RNTI (or SDT-RNTI) (This PDCCH may schedule new DL TB or new UL transmission for a HARQ process (HARQ process can be same as the HARQ process used for transmitting first UL packet or can be a different HARQ process)), the UE may monitor the short message in any paging occasion at least once per SI modification period, in case that the ongoing SDT procedure is not the RA-SDT.

In step S760, upon completion of a random access procedure initiated for the SDT, the UE may monitor the short message in any paging occasion at least once per the SI modification period, in case that the ongoing SDT procedure is the RA-SDT.

In step S770, when the SDT procedure is terminated or completed, the UE may monitor the short message in its paging occasion of every DRX cycle.

Figure 8:
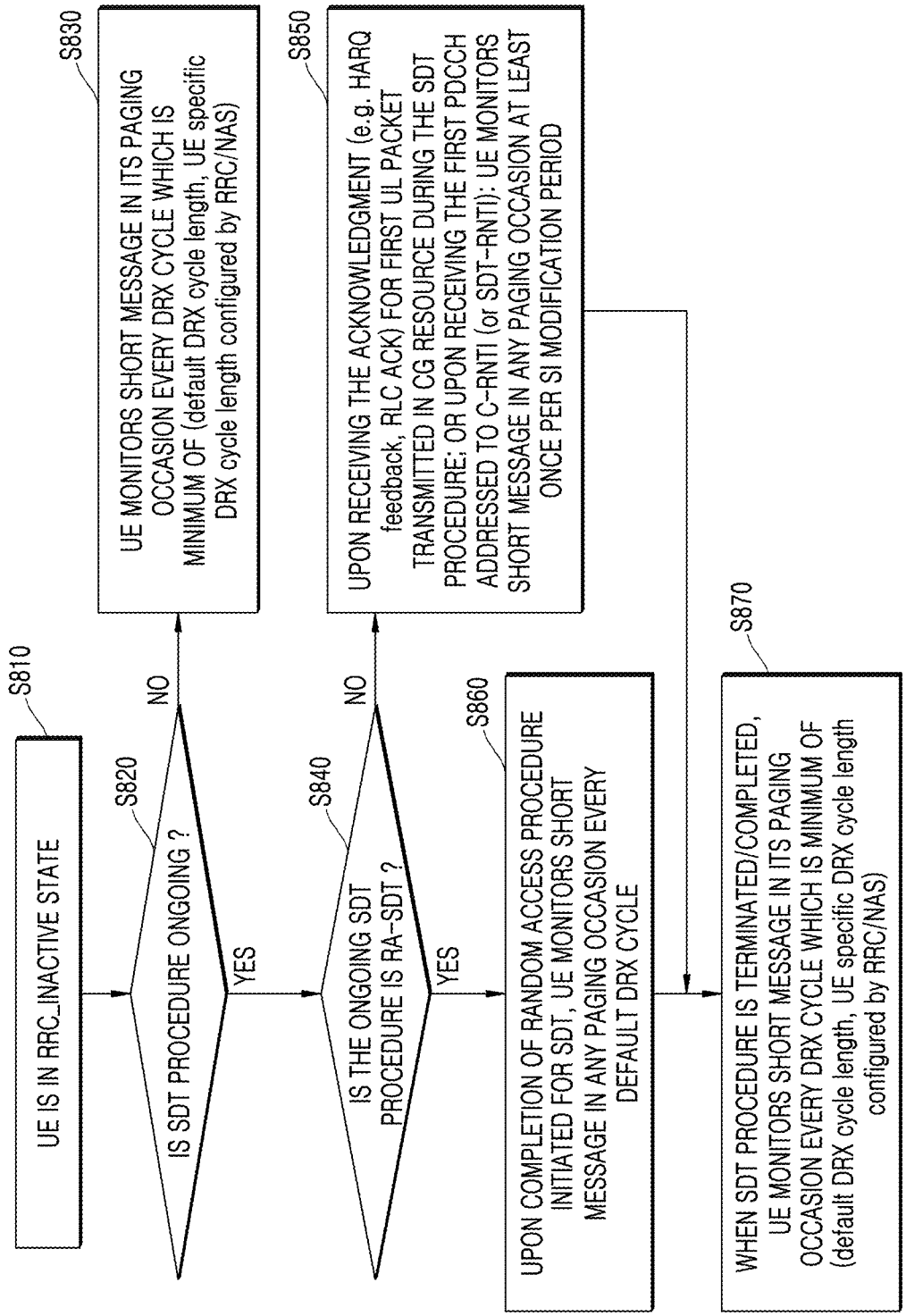
FIG. 8 illustrates a flow chart of an operation by the UE in an RRC_INACTIVE state for monitoring short message in paging occasion according to the embodiment in the disclosure.

FIG. 8 illustrates a flow chart of an operation by the UE in the RRC_INACTIVE state for monitoring short message in paging occasion according to the embodiment in the disclosure.

In step S810, the UE is in a RRC_INACTIVE state.

In step S820, the UE determines whether the SDT procedure is ongoing.

In step S830, the UE may monitor a short message in its paging occasion of every DRX cycle (T) which is minimum among a default DRX cycle length and a UE specific DRX cycled length configured by RRC/NAS as explained earlier, in case that the SDT procedure is not ongoing.

In step S840, the UE may determine whether the ongoing SDT procedure is a RA-SDT procedure.

In step S850, upon receiving the acknowledgement (e.g. HARQ feedback, RLC ACK) for a first UL packet transmitted in a CG resource during the SDT procedure or upon receiving a first PDCCH addressed to a C-RNTI (or SDT-RNTI) (This PDCCH may schedule new DL TB or new UL transmission for a HARQ process (HARQ process can be same as the HARQ process used for transmitting first UL packet or can be a different HARQ process)), the UE may monitor the short message in any paging occasion at least once per SI modification period, in case that the ongoing SDT procedure is not the RA-SDT.

In step S860, upon completion of a random access procedure initiated for the SDT, the UE may monitor the short message in any paging occasion of every default DRX cycle, in case that the ongoing SDT procedure is the RA-SDT.

In step S870, when the SDT procedure is terminated or completed, the UE may monitor the short message in its paging occasion of every DRX cycle (T) which is minimum among a default DRX cycle length and a UE specific DRX cycled length configured by RRC/NAS, as explained earlier.

Figure 9:
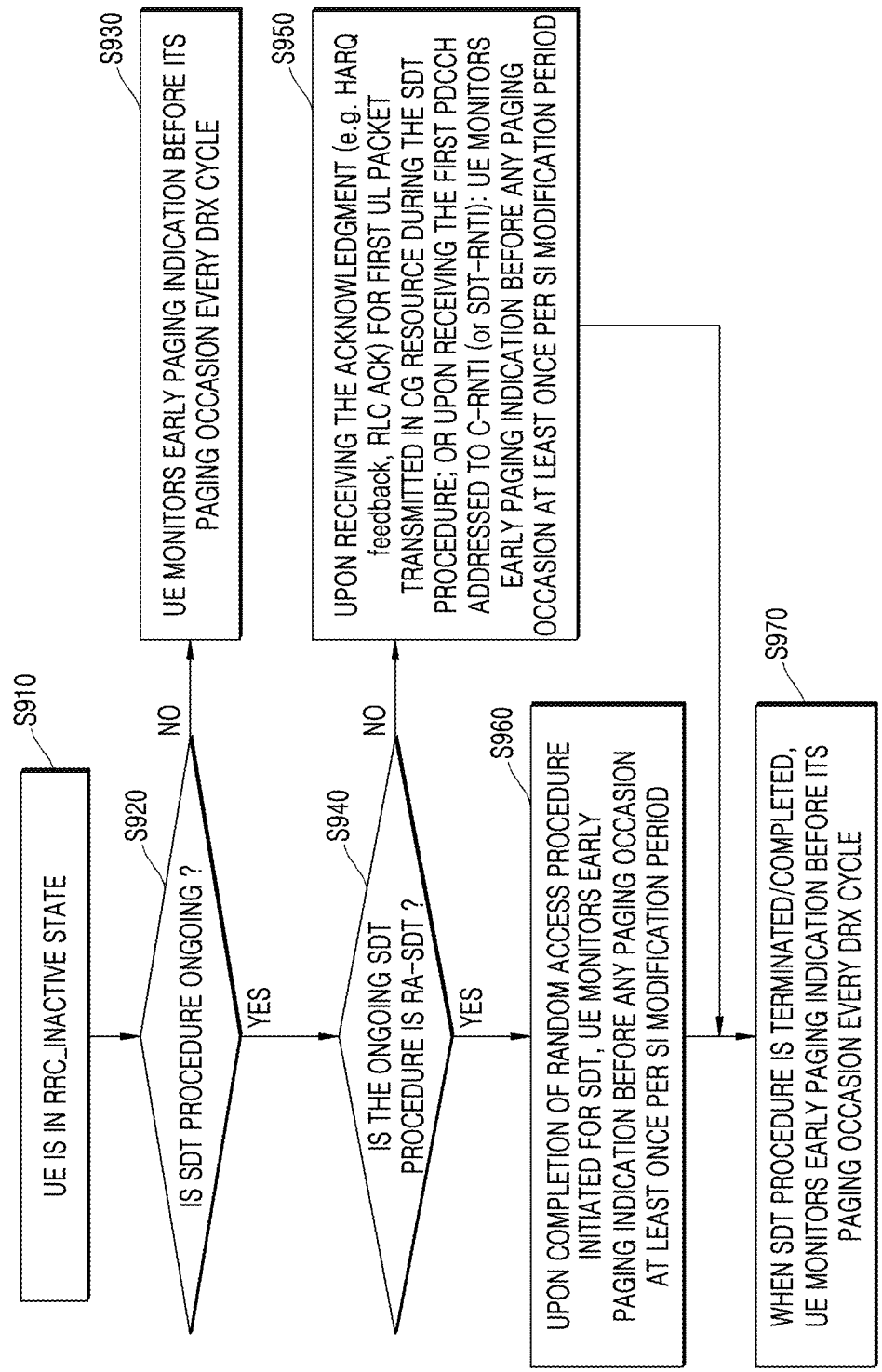
FIG. 9 illustrates a flow chart of an operation by the UE in an RRC_INACTIVE state for monitoring early paging indication according to the embodiment in the disclosure.

FIG. 9 illustrates a flow chart of an operation by the UE in the RRC_INACTIVE state for monitoring early paging indication according to the embodiment in the disclosure.

In step S910, the UE is in a RRC_INACTIVE state.

In step S920, the UE determines whether the SDT procedure is ongoing.

In step S930, the UE may monitor an early paging indication before its paging occasion of every DRX cycle (T), in case that the SDT procedure is not ongoing.

In step S940, the UE may determine whether the ongoing SDT procedure is a RA-SDT procedure.

In step S950, upon receiving the acknowledgement (e.g. HARQ feedback, RLC ACK) for a first UL packet transmitted in a CG resource during the SDT procedure or upon receiving a first PDCCH addressed to a C-RNTI (or SDT-RNTI) (This PDCCH may schedule new DL TB or new UL transmission for a HARQ process (HARQ process can be same as the HARQ process used for transmitting first UL packet or can be a different HARQ process)), the UE may monitor the early paging indication before any paging occasion at least once per SI modification period, in case that the ongoing SDT procedure is not the RA-SDT.

In step S960, upon completion of a random access procedure initiated for the SDT, the UE may monitor the early paging indication before any paging occasion at least once per SI modification period, in case that the ongoing SDT procedure is the RA-SDT.

In step S970, when the SDT procedure is terminated or completed, the UE may monitor the early paging indication before its paging occasion of every DRX cycle (T).

Figure 10:
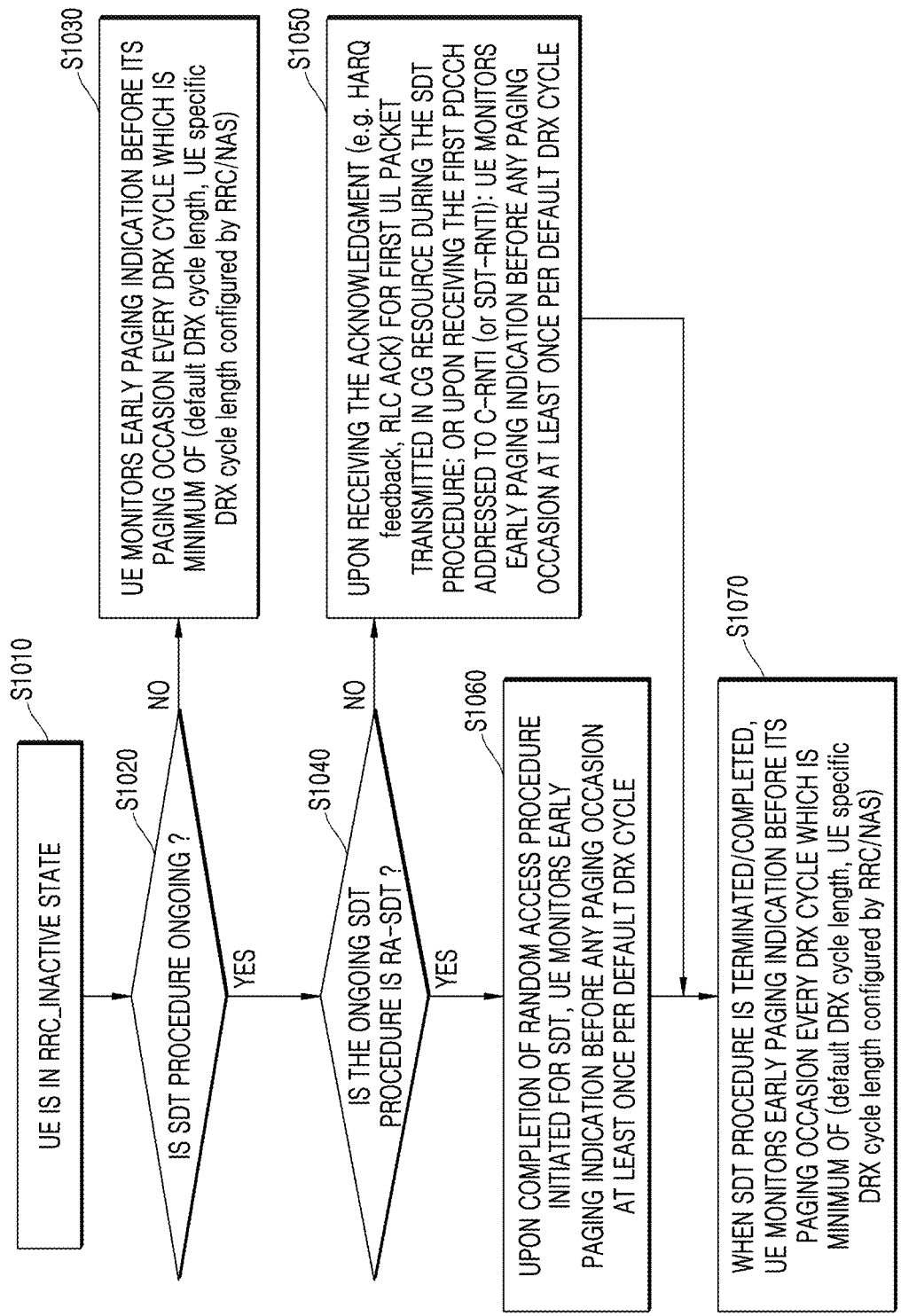
FIG. 10 illustrates a flow chart of an operation by the UE in an RRC_INACTIVE state for monitoring early paging indication according to the embodiment in the disclosure.

FIG. 10 illustrates a flow chart of an operation by the UE in the RRC_INACTIVE state for monitoring early paging indication according to the embodiment in the disclosure.

In step S1010, the UE is in a RRC_INACTIVE state.

In step S1020, the UE determines whether the SDT procedure is ongoing.

In step S1030, the UE may monitor an early paging indication before its paging occasion of every DRX cycle (T) which is minimum among a default DRX cycle length and a UE specific DRX cycled length configured by RRC/NAS as explained earlier, in case that the SDT procedure is not ongoing.

In step S1040, the UE may determine whether the ongoing SDT procedure is a RA-SDT procedure.

In step S1050, upon receiving the acknowledgement (e.g. HARQ feedback, RLC ACK) for a first UL packet transmitted in a CG resource during the SDT procedure or upon receiving a first PDCCH addressed to a C-RNTI (or SDT-RNTI) (This PDCCH may schedule new DL TB or new UL transmission for a HARQ process (HARQ process can be same as the HARQ process used for transmitting first UL packet or can be a different HARQ process)), the UE may monitor the early paging indication before any paging occasion at least once per default DRX cycle, in case that the ongoing SDT procedure is not the RA-SDT.

In step S1060, upon completion of a random access procedure initiated for the SDT, the UE may monitor the early paging indication before any paging occasion at least once per default DRX cycle, in case that the ongoing SDT procedure is the RA-SDT.

In step S1070, when the SDT procedure is terminated or completed, the UE may monitor the early paging indication before its paging occasion of every DRX cycle (T) which is minimum among a default DRX cycle length and a UE specific DRX cycled length configured by RRC/NAS as explained earlier.

Embodiment 2

Figure 11:
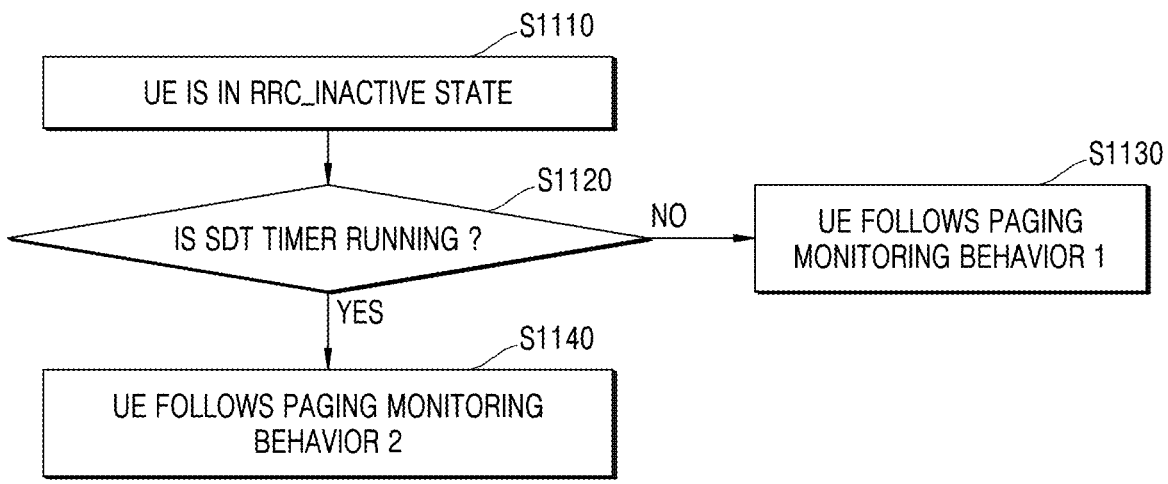
FIG. 11 illustrates a flow chart of an operation by the UE in an RRC_INACTIVE state for paging monitoring according to the embodiment in the disclosure.

The UE is in the RRC_INACTIVE state (or in an alternate embodiment the UE is in the RRC_INACTIVE state and initial DL BWP is used for receiving DL from gNB, note that there can be an initial DL BWP and an redcap (reduced capability) initial DL BWP configured in camped cell):
The UE checks whether SDT timer (can also be referred as SDT failure or error detection timer) is running or not.
If SDT timer is running (or if SDT timer is running and the UE is in the RRC_INACTIVE state), the UE may follow Paging Monitoring Behavior 2 as explained below:
  The UE may monitor for a System information modification notification (i.e. SystemInfoModification) in any paging occasion at least once per SI modification period (or modification period). The length of SI modification period is in multiple of length of default DRX cycle. The length of the SI modification period is received from the gNB in system information. The SI modification period boundaries are defined by SFN values for which SFN mod m=0, where the m is the number of radio frames comprising the SI modification period. The UE may monitor for an emergency notification (i.e. etwsAndCmasIndication) in any paging occasion at least once per default DRX cycle. The length of default DRX cycle is received from the gNB in system information.
    In an embodiment, the UE may monitor a PDCCH addressed to a P-RNTI in any paging occasion at least once per SI modification period for the System information modification notification. In an embodiment, the UE may monitor the PDCCH addressed to the P-RNTI in any paging occasion at least once per default DRX cycle for the emergency notification. Alternately, the UE may monitor the PDCCH addressed to the P-RNTI in any paging occasion at least once per default DRX cycle for the System information modification notification and the emergency notification.
    In an embodiment, if an early paging indication is supported and the early paging indication supports a short message or the SI update notification, the UE may monitor the early paging indication before any paging occasion at least once per SI modification period. In an embodiment, if the early paging indication is supported and the early paging indication supports the emergency notification, the UE may monitor the early paging indication before any paging occasion at least once per default DRX cycle. In an embodiment, if the early paging indication is supported and the early paging indication supports the emergency notification and the SI update notifications, the UE may monitor the early paging indication before any paging occasion at least once per default DRX cycle. The UE may not monitor the PDCCH addressed to the P-RNTI in any paging occasion.
    In an embodiment, if the early paging indication is supported and the early paging indication does not support short message or the SI update notification/emergency notification, the UE may monitor the early paging indication before any paging occasion at least once per SI modification period. In an embodiment, if the early paging indication is supported and the early paging indication does not support short message or the SI update notification/emergency notification, the UE may monitor the early paging indication before any paging occasion at least once per default DRX cycle. If an indication by the early paging indication (or the early paging indication indicates the UE to monitor its paging occasion), the UE may monitor the PDCCH addressed to the P-RNTI in the paging occasion.
  The UE may not monitor for the paging indication (i.e. The UE may ignore the scheduled information for paging message in paging DCI i.e. DCI received in the PDCCH addressed to the P-RNTI in the monitored paging occasion)
Else (i.e. If SDT timer is not running)
The UE may follow Paging Monitoring Behavior 1 as explained below.
  The UE may monitor a System information modification notification (i.e. SystemInfoModification) and an emergency notification (i.e. etwsAndCmasIndication) in its own paging occasion every DRX cycle (T). The UE may monitor for paging indication in its own paging occasion every DRX cycle (T). The UE may monitor a short message in its own paging occasion every DRX cycle (T). The UE's paging occasion is determined as explained earlier in the background.
    If the early paging indication is not supported in the camped cell, the UE may monitor the PDCCH addressed to the P-RNTI in its paging occasion every DRX cycle.
    If the early paging indication is supported in the camped cell, the UE may monitor the early paging indication before its paging occasion every DRX cycle. Early paging indication is a sequence or PDCCH transmitted before the paging occasion. If indication by early paging indication (or early paging indication indicates the UE to monitor its paging occasion), the UE may monitor the PDCCH addressed to the P-RNTI in its paging occasion.
  The DRX cycle length is determined by the shortest among the UE specific DRX value configured by RRC, the UE specific DRX value configured by NAS, and a default DRX cycle value broadcasted in system information FIG. 11 illustrates a flow chart of an operation by the UE in the RRC_INACTIVE state for paging monitoring according to the embodiment in the disclosure.

In step S1110, the UE is in an RRC_INACTIVE state.

In step S1120, the UE determines whether a SDT timer is running.

In step S1130, the UE may follow the first paging monitoring behavior (Paging Monitoring Behavior 1), in case that the SDT timer is not running.

In step S1140, the UE may follow the second paging monitoring behavior (Paging Monitoring Behavior 2), in case that the SDT timer is running.

Figure 12:
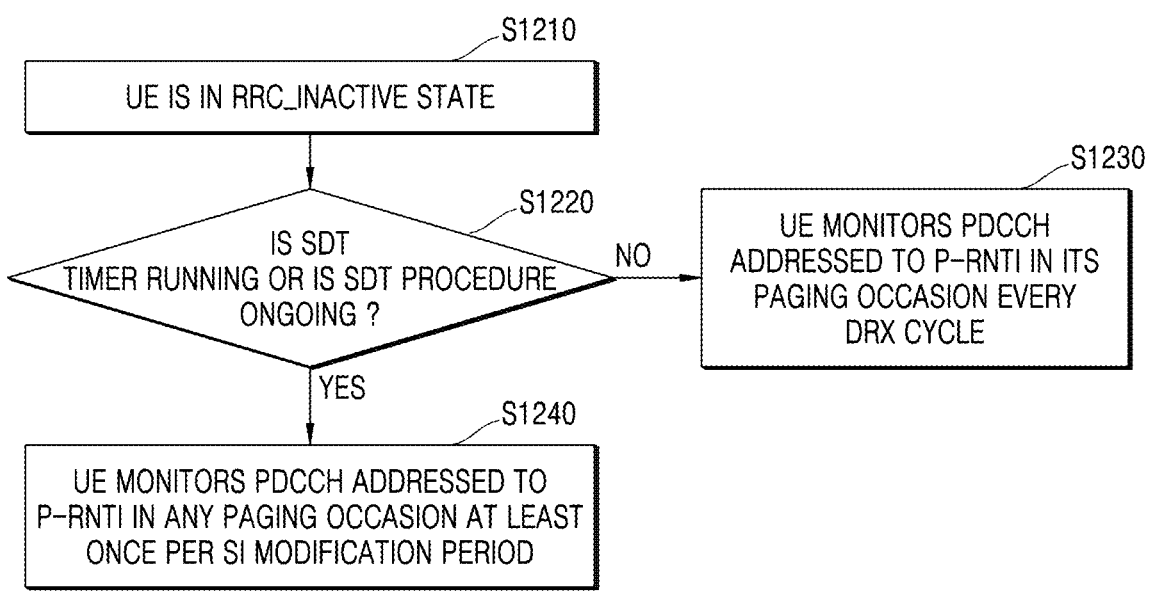
FIG. 12 illustrates a flow chart of an operation by the UE in an RRC_INACTIVE state for PDCCH monitoring in paging occasion according to the embodiment in the disclosure.

FIG. 12 illustrates a flow chart of an operation by the UE in the RRC_INACTIVE state for PDCCH monitoring in paging occasion according to the embodiment in the disclosure.

In step S1210, the UE is in an RRC_INACTIVE state.

In step S1220, the UE determines whether a SDT timer is running (or a SDT procedure is ongoing).

In step S1230, the UE may monitor a PDCCH addressed to a P-RNTI in its paging occasion of every DRX cycle (T), in case that the SDT timer is not running (or the SDT procedure is not ongoing).

In step S1240, the UE may monitor the PDCCH addressed to the P-RNTI in any paging occasion at least once per SI modification period, in case that SDT timer is running (or the SDT procedure is ongoing).

Figure 13:
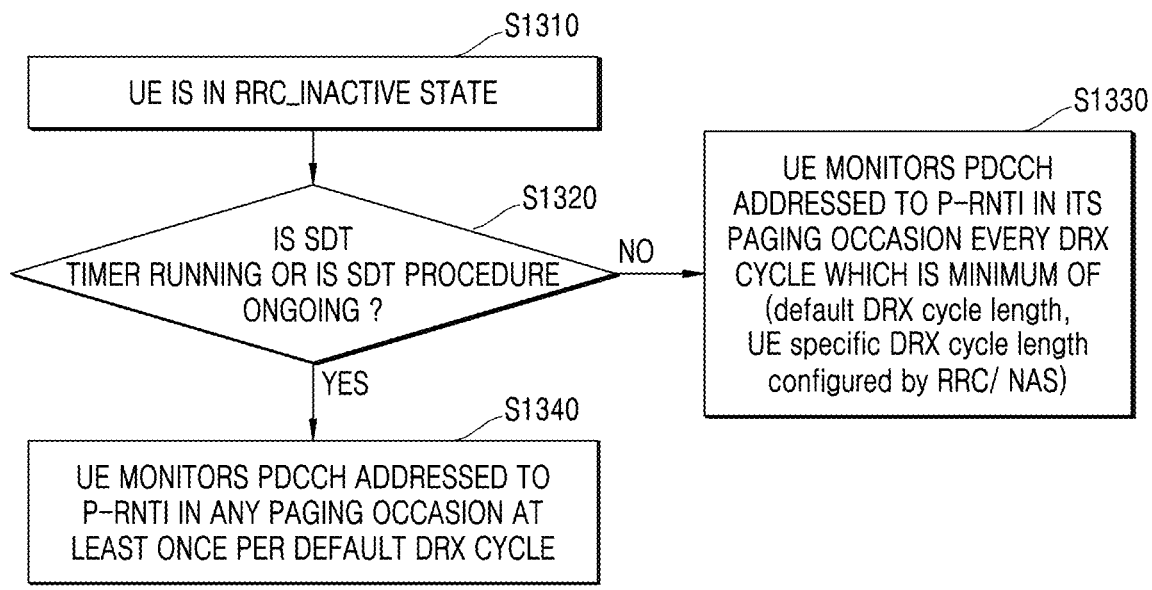
FIG. 13 illustrates a flow chart of an operation by the UE in an RRC_INACTIVE state for PDCCH monitoring in paging occasion according to the embodiment in the disclosure.

FIG. 13 illustrates a flow chart of an operation by the UE in the RRC_INACTIVE state for PDCCH monitoring in paging occasion according to the embodiment in the disclosure.

In step S1310, the UE is in an RRC_INACTIVE state.

In step S1320, the UE determines whether a SDT timer is running (or a SDT procedure is ongoing).

In step S1330, the UE may monitor a PDCCH addressed to a P-RNTI in its paging occasion of every DRX cycle (T) which is minimum among a default DRX cycle length and a UE specific DRX cycled length configured by RRC/NAS, in case that the SDT timer is not running (or the SDT procedure is not ongoing).

In step S1340, the UE may monitor the PDCCH addressed to the P-RNTI in any paging occasion at least once per default DRX cycle, in case that SDT timer is running (or the SDT procedure is ongoing).

Figure 14:
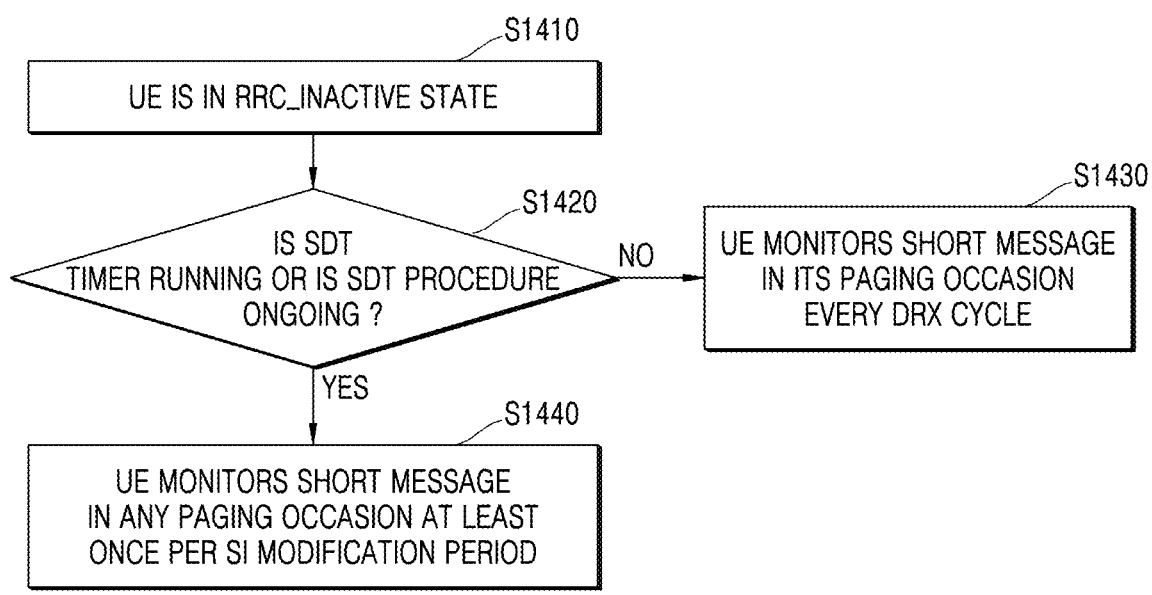
FIG. 14 illustrates a flow chart of an operation by the UE in an RRC_INACTIVE state for short message monitoring in paging occasion according to the embodiment in the disclosure.

FIG. 14 illustrates a flow chart of an operation by the UE in the RRC_INACTIVE state for short message monitoring in paging occasion according to the embodiment in the disclosure.

In step S1410, the UE is in an RRC_INACTIVE state.

In step S1420, the UE determines whether a SDT timer is running (or a SDT procedure is ongoing).

In step S1430, the UE may monitor a short message in its paging occasion of every DRX cycle (T), in case that the SDT timer is not running (or the SDT procedure is not ongoing).

In step S1440, the UE may monitor the short message in any paging occasion at least once per SI modification period, in case that SDT timer is running (or the SDT procedure is ongoing).

Figure 15:
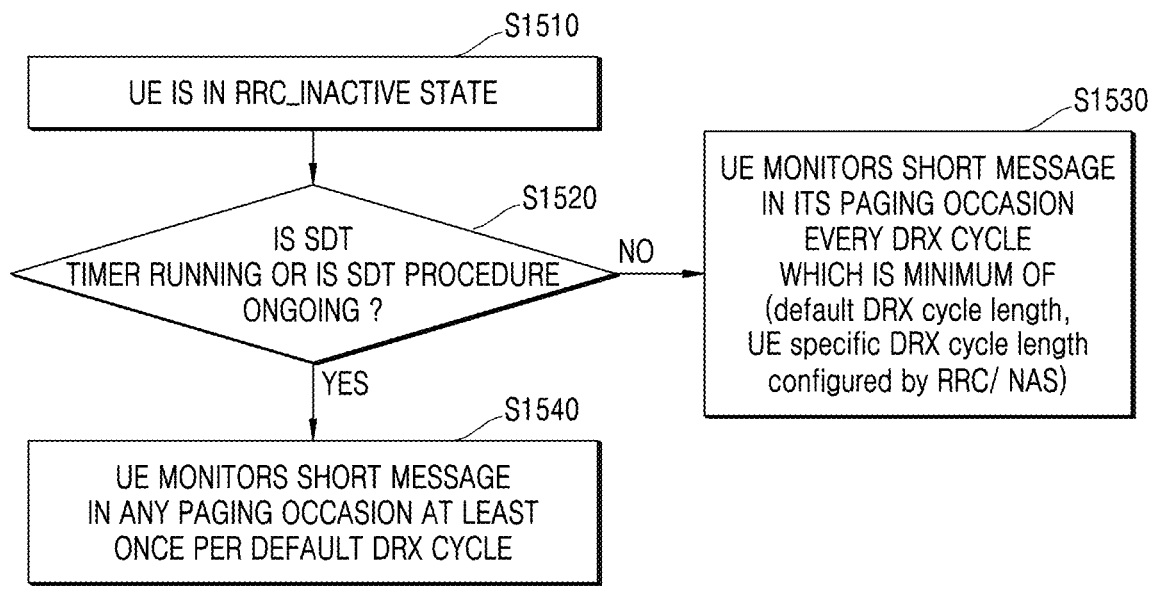
FIG. 15 illustrates a flow chart of an operation by the UE in an RRC_INACTIVE state for short message monitoring in paging occasion according to the embodiment in the disclosure.

FIG. 15 illustrates a flow chart of an operation by the UE in the RRC_INACTIVE state for short message monitoring in paging occasion according to the embodiment in the disclosure.

In step S1510, the UE is in a RRC_INACTIVE state.

In step S1520, the UE determines whether a SDT timer is running (or a SDT procedure is ongoing).

In step S1530, the UE may monitor a short message in its paging occasion of every DRX cycle (T) which is minimum among a default DRX cycle length and a UE specific DRX cycled length configured by RRC/NAS, in case that the SDT timer is not running (or the SDT procedure is not ongoing).

In step S1540, the UE may monitor the short message in any paging occasion at least once per default DRX cycle, in case that SDT timer is running (or the SDT procedure is ongoing).

Figure 16:
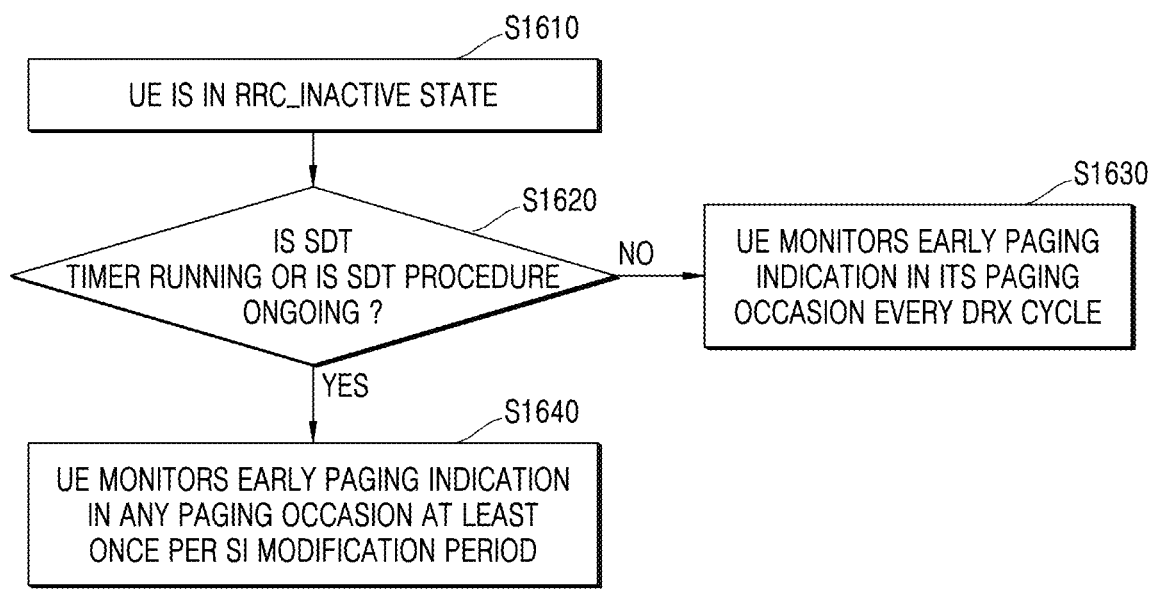
FIG. 16 illustrates a flow chart of an operation by the UE in an RRC_INACTIVE state for early paging indication according to the embodiment in the disclosure.

FIG. 16 illustrate a flow chart of an operation by the UE in the RRC_INACTIVE state for early paging indication according to the embodiment in the disclosure.

In step S1610, the UE is in a RRC_INACTIVE state.

In step S1620, the UE determines whether a SDT timer is running (or a SDT procedure is ongoing).

In step S1630, the UE may monitor an early paging indication in its paging occasion of every DRX cycle, in case that the SDT timer is not running (or the SDT procedure is not ongoing).

In step S1640, the UE may monitor the early paging indication in any paging occasion at least once per SI modification period, in case that SDT timer is running (or the SDT procedure is ongoing).

Figure 17:
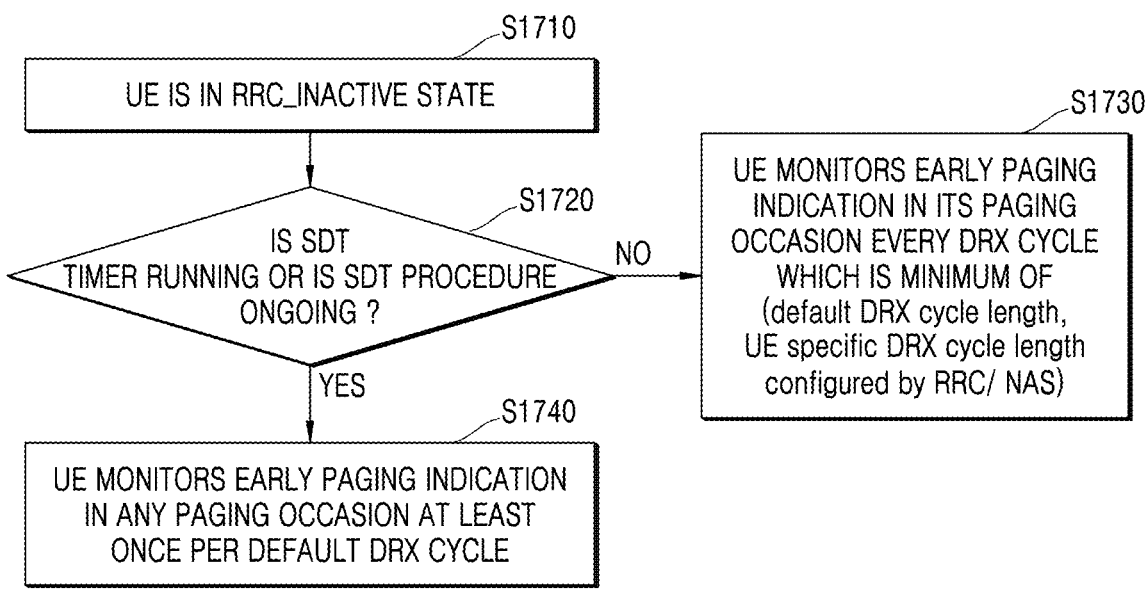
FIG. 17 illustrates a flow chart of an operation by the UE in an RRC_INACTIVE state for short message monitoring in paging occasion according to the embodiment in the disclosure.

FIG. 17 illustrates a flow chart of an operation by the UE in the RRC_INACTIVE state for short message monitoring in paging occasion according to the embodiment in the disclosure.

In step S1710, the UE is in an RRC_INACTIVE state.

In step S1720, the UE determines whether a SDT timer is running (or a SDT procedure is ongoing).

In step S1730, the UE may monitor an early paging indication in its paging occasion of every DRX cycle (T) which is minimum among a default DRX cycle length and a UE specific DRX cycled length configured by RRC/NAS as explained earlier, in case that the SDT timer is not running (or the SDT procedure is not ongoing).

In step S1740, the UE may monitor the early paging indication in any paging occasion at least once per default DRX cycle, in case that SDT timer is running (or the SDT procedure is ongoing).

Embodiment 3

The UE is in the RRC_INACTIVE state

The UE checks whether SDT procedure is ongoing or not

If SDT procedure is ongoing (or if SDT procedure is ongoing and the UE is in the RRC_INACTIVE state), the UE may follow Paging Monitoring Behavior 2 as explained below:

The UE may monitor for a System information modification notification (i.e. SystemInfoModification) in any paging occasion at least once per SI modification period (or modification period). The length of SI modification period is in multiple of length of default DRX cycle. The length of SI modification period is received from the gNB in system information. The SI modification period boundaries are defined by SFN values for which SFN mod m=0, where the m is the number of radio frames comprising the SI modification period. The UE may monitor an emergency notification (i.e. etwsAndCmasIndication) in any paging occasion at least once per default DRX cycle. The length of default DRX cycle is received from the gNB in system information.

In an embodiment, the UE may monitor a PDCCH addressed to a P-RNTI in any paging occasion at least once per SI modification period for the System information modification notification. In an embodiment, the UE may monitor the PDCCH addressed to the P-RNTI in any paging occasion at least once per default DRX cycle for emergency notifications. Alternately, the UE may monitor the PDCCH addressed to the P-RNTI in any paging occasion at least once per default DRX cycle for the System information modification notification and the emergency notification.

In an embodiment, if an early paging indication is supported and the early paging indication supports a short message or the SI update notification, the UE may monitor the early paging indication before any paging occasion at least once per SI modification period. In an embodiment, if the early paging indication is supported and the early paging indication supports the emergency notification, the UE may monitor the early paging indication before any paging occasion at least once per default DRX cycle. In an embodiment, if the early paging indication is supported and the early paging indication supports the emergency notification and the SI update notification, the UE may monitor the early paging indication before any paging occasion at least once per default DRX cycle. The UE does not monitor the PDCCH addressed to the P-RNTI in any paging occasion.

In an embodiment, if the early paging indication is supported and the early paging indication does not support the short message or the SI update notification/emergency notification, the UE may monitor the early paging indication before any paging occasion at least once per SI modification period. In an embodiment, if the early paging indication is supported and the early paging indication does not support the short message or the SI update notification/emergency notifications, the UE may monitor the early paging indication before any paging occasion at least once per default DRX cycle. If indication by the early paging indication (or the early paging indication indicates the UE to monitor its paging occasion), the UE may monitor the PDCCH addressed to the P-RNTI in the paging occasion.

The UE may not monitor for paging indication (i.e. the UE ignores the scheduled information for paging message in paging DCI i.e. DCI received in the PDCCH addressed to the P-RNTI in the monitored paging occasion)

Else (i.e. If SDT procedure is not ongoing)
The UE may follow Paging Monitoring Behavior 1 as explained below.

The UE may monitor the System information modification notification (i.e. SystemInfoModification) and the emergency notification (i.e. etwsAndCmasIndication) in its own paging occasion every DRX cycle (T). The UE may monitor for paging indication in its own paging occasion every DRX cycle (T). The UE's paging occasion is determined as explained earlier in the background.

If the early paging indication is not supported in the camped cell, the UE may monitor the PDCCH addressed to the P-RNTI in its paging occasion every DRX cycle (T).

If the early paging indication is supported in the camped cell, the UE may monitor the early paging indication before its paging occasion every DRX cycle (T). If indication by the early paging indication (or the early paging indication indicates the UE to monitor its paging occasion), the UE may monitor the PDCCH addressed to the P-RNTI in its paging occasion.

Figure 18:
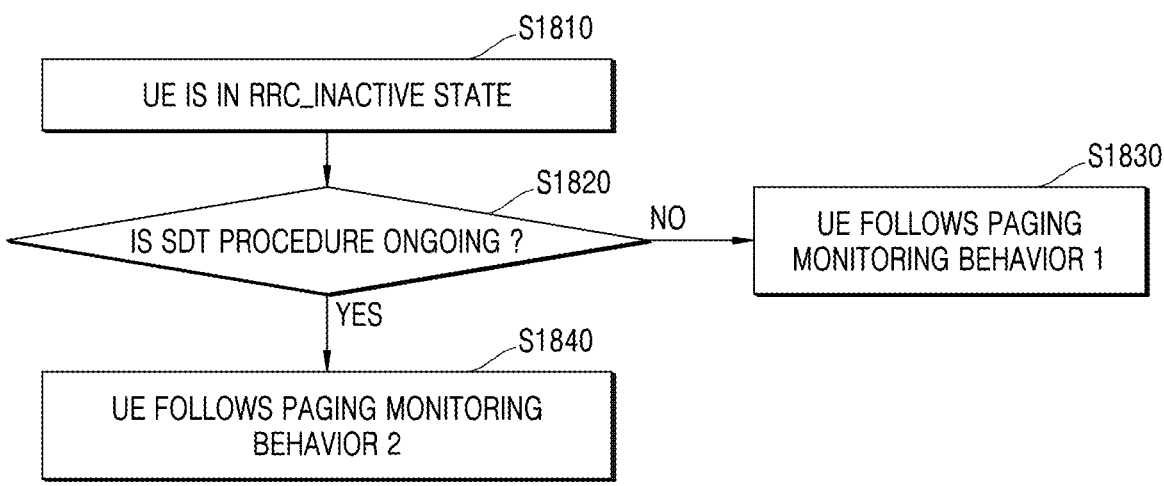
FIG. 18 illustrates a diagram of an operation by the UE in an RRC_INACTIVE state for paging monitoring according to the embodiment in the disclosure.

The DRX cycle length is determined by the shortest value among the UE specific DRX value configured by RRC, UE specific DRX value configured by NAS (non-access-stratum), and a default DRX cycle value broadcast in system information FIG. 18 illustrate a diagram of an operation by the UE in the RRC_INACTIVE state for paging monitoring according to the embodiment in the disclosure.

In step S1810, the UE is in a RRC_INACTIVE state.

In step S1820, the UE determines whether an SDT procedure is ongoing.

In step S1830, the UE may follow the first paging monitoring behavior (Paging Monitoring Behavior 1), in case that the SDT procedure is not ongoing.

In step S1840, the UE may follow the second paging monitoring behavior (Paging Monitoring Behavior 2), in case that the SDT procedure is ongoing.

SI Request during the SDT procedure

Embodiment 1

In this embodiment of the disclosure, an additional condition/criteria is added for the SI request initiation in the RRC_INACTIVE state. When a UE needs to acquire a SIB, it checks whether the SDT procedure is ongoing or not; or whether a SDT timer is running or not. SDT timer can also be referred as SDT failure/error detection timer. The UE operation is as follows:

if SDT procedure is not ongoing (or if SDT timer is not running):
    if SIB1 includes si-SchedulingInfo containing si-RequestConfigSUL and criteria to select supplementary uplink is met:
        initiate RA for Msg1 based SI request on SUL
    else if SIB1 includes si-SchedulingInfo containing si-RequestConfig and criteria to select normal uplink is met:
        initiate RA for Msg1 based SI request on NUL
    else
        initiate transmission of RRCSystemInfoRequest The si-SchedulingInfo contains information needed for acquisition of SI messages. The si-RequestConfigSUL represents configuration of Msg1 resources that the UE uses for requesting SI-messages, on supplementary uplink (SUL). The si-RequestConfig represents configuration of Msg1 resources that the UE uses for requesting SI-messages, on normal uplink (NUL).

Upon receiving SI request ACK, the UE may monitor SI window for receiving SI message
    In case of Msg1 based SI request, reception of RAR corresponding to RAPID of transmitted preamble, is considered as SI request ACK
    In case of Msg3 based SI request (i.e. RRCSystemInfoRequest), reception of contention resolution identity matching the 48 bits of transmitted CCCH SDU, is considered as SI request ACK Embodiment 2

In this embodiment of the disclosure, an additional condition/criteria is added for SI request initiation in the RRC_INACTIVE state. When a UE needs to acquire a SIB and the UE is in the RRC_INACTIVE state, it checks whether the SDT procedure is ongoing or not; or whether the SDT timer is running or not. The UE operation is as follows:

If the UE is in the RRC_IDLE state
    if SIB1 includes si-SchedulingInfo containing si-RequestConfigSUL and criteria to select supplementary uplink is met:
        initiate RA for Msg1 based SI request on SUL
    else if SIB1 includes si-SchedulingInfo containing si-RequestConfig and criteria to select normal uplink is met:
        initiate RA for Msg1 based SI request on NUL
    else initiate transmission of RRCSystemInfoRequest
else if the UE in the RRC_INACTIVE state:
  if SDT procedure is not ongoing (or if SDT timer is not running):
    if SIB1 includes si-SchedulingInfo containing si-RequestConfigSUL and criteria to select supplementary uplink is met:
      initiate RA for Msg1 based SI request on SUL
    else if SIB1 includes si-SchedulingInfo containing si-RequestConfig and criteria to select normal uplink is met:
      initiate RA for Msg1 based SI request on NUL
    else
      initiate transmission of RRCSystemInfoRequest
Upon receiving SI request ACK, the UE monitors the SI window for receiving the SI message
  In case of a Msg1 based SI request, reception of an RAR corresponding to RAPID of the transmitted preamble, is considered as SI request ACK
  In case of a Msg3 based SI request (i.e. RRCSystemInfoRequest), reception of contention resolution identity matching the 48 bits of transmitted CCCH SDU, is considered as an SI request ACK Embodiment 3

In this embodiment of the disclosure, if the SDT procedure is ongoing (or if the SDT timer is running), the UE is only allowed to initiate transmission of RRCSystemInfoRequest. The UE operation is as follows:
  if SIB1 includes si-SchedulingInfo containing si-RequestConfigSUL and criteria to select supplementary uplink is met and SDT procedure is not ongoing (or SDT timer is not running):
    initiate RA for Msg1 based SI request on SUL
  else if SIB/includes si-SchedulingInfo containing si-RequestConfig and criteria to select normal uplink is met and SDT procedure is not ongoing (or SDT timer is not running):
    initiate RA for Msg1 based SI request on NUL
  else
    initiate transmission of RRCSystemInfoRequest
Upon receiving SI request ACK, the UE may monitor SI window for receiving SI message
  In case of Msg1 based SI request, reception of RAR corresponding to RAPID of transmitted preamble, is considered as SI request ACK
  In case of Msg3 based SI request (i.e. RRCSystemInfoRequest), reception of contention resolution identity matching the 48 bits of transmitted CCCH SDU, is considered as SI request ACK
Additional Issue:
  Currently, RRCSystemInfoRequest, triggers RACH as there is no UL grant available in MAC. However, in case of SDT, UL grant can be available in MAC and RACH may not be triggered.
  In absence of RACH, SI request ack is not available. Currently SI request ack is implicit; once contention resolution is successful, SI request ack is assumed to be received and MAC informs the same to RRC.
  So question is, when does MAC indicates to upper layer that SI request ack is received in case RRCSystemInfoRequest is transmitted during SDT procedure without RACH.
Options
  Option 1: If data becomes available in CCCH while SDT is ongoing, RACH is initiated.
  Option 2: SI request ack is considered to be received if UE receives HARQ ACK for MAC PDU including RRCSystemInfoRequest (or CCCH)
  Option 3: SI request ack is considered to be received if UE receives PDCCH with NDI toggled for HARQ process used for MAC PDU including RRCSystemInfoRequest
  Option 4: SI request is transmitted using SRB1 (DCCH) and UE receives RLC ACK for RLC SDU including RRCSystemInfoRequest
  Option 5: SI request ack is considered to be received if UE receives SI request MAC CE (new MAC CE)
  Option 6: SI request ack is considered to be received if the UE receives DCI including the SI request Ack bit
  Option 7: If RRCSystemInfoRequest is initiated by RRC while SDT is ongoing, RACH is initiated.

Embodiment 4

In this embodiment of the disclosure, if the SDT procedure is ongoing (or if the SDT timer is running), the UE is allowed to initiate Msg1 based SI request or RRCSystemInfoRequest. However, the UL carrier should be the one which is selected for ongoing SDT to avoid UL switching. The UE operation is as follows:
  if SIB/includes si-SchedulingInfo containing si-RequestConfigSUL and criteria to select supplementary uplink is met and SDT procedure is not ongoing: or if SIB1 includes si-SchedulingInfo containing si-RequestConfigSUL and SDT procedure is ongoing and supplementary uplink is selected for SDT:
  initiate RA for Msg1 based SI request on SUL
    else if SIB1 includes si-SchedulingInfo containing si-RequestConfig and criteria to select normal uplink is met and SDT procedure is not ongoing; or if SIB1 includes si-SchedulingInfo containing si-RequestConfig and SDT procedure is ongoing and normal uplink is selected for SDT:
  initiate RA for Msg1 based SI request on NUL
  else
    initiate transmission of RRCSystemInfoRequest
Upon receiving SI request ACK, the UE may monitor SI window for receiving SI message
  In case of Msg1 based SI request, reception of RAR corresponding to RAPID of transmitted preamble, is considered as SI request ACK
  In case of Msg3 based SI request (i.e. RRCSystemInfoRequest), reception of contention resolution identity matching the 48 bits of transmitted CCCH SDU, is considered as SI request ACK
Additional Issue:
  Currently, RRCSystemInfoRequest, triggers RACH as there is no UL grant available in MAC. However, in case of SDT, UL grant can be available in MAC and RACH may not be triggered.
  In absence of RACH, SI request ack is not available. Currently SI request ack is implicit; once contention resolution is successful, SI request ack is assumed to be received and MAC informs the same to RRC.
  So question is, when does MAC indicates to upper layer that SI request ack is received in case RRCSystemInfoRequest is transmitted during SDT procedure without RACH.
Options
  Option 1: If data becomes available in CCCH while SDT is ongoing, RACH is initiated.

Option 2: SI request ack is considered to be received if the UE receives HARQ ACK for MAC PDU including RRCSystemInfoRequest (or CCCH)

Option 3: SI request ack is considered to be received if the UE receives PDCCH with NDI toggled for HARQ process used for MAC PDU including RRCSystemInfoRequest Option 4: SI request is transmitted using SRB1 (DCCH) and the UE receives RLC ACK for RLC SDU including RRCSystemInfoRequest Option 5: SI request ack is considered to be received if the UE receives SI request MAC CE (new MAC CE)

Option 6: SI request ack is considered to be received if the UE receives DCI including SI request Ack bit Embodiment 5

The UE is in the RRC_INACTIVE state

Criteria to perform SDT is met. The UE initiates SDT procedure.

The UE selects the UL carrier for SDT, say carrier X (X is NUL or SUL)

While SDT is ongoing, Msg1 based SI request is initiated

The UE selects the UL carrier for SI request, say carrier Y (Y is NUL or SUL)

The UE transmits the SI request

If SDT is ongoing and UL carrier selected for SDT is different from UL carrier selected for SI request:

The UE shall switch to UL carrier for SI request only during the RACH occasion selected for transmitting the SI request and upon transmitting the SI request, the UE switches back to UL carrier selected for SDT In an embodiment, the UE selects an RO for SI request which is not overlapping with UL grant for SDT.

Figure 19:
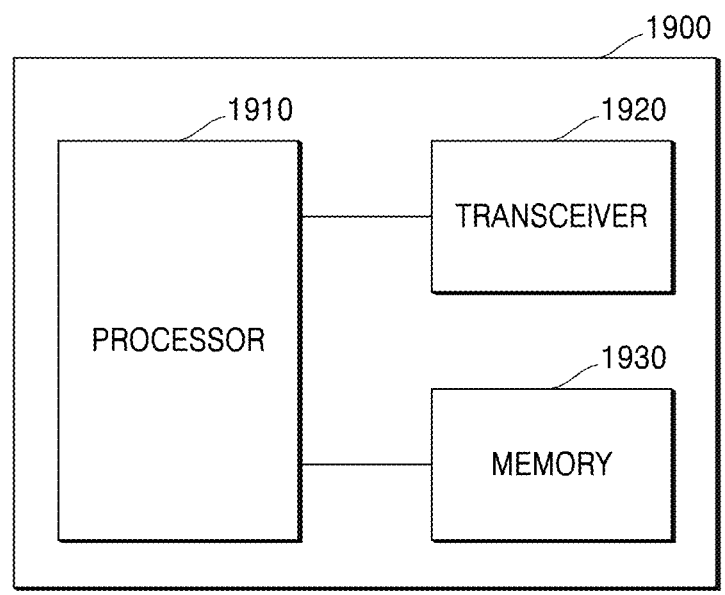
FIG. 19 illustrates a diagram of a UE according to an embodiment of the present disclosure.

FIG. 19 illustrates a diagram of a UE 1900 according to an embodiment of the present disclosure.

Referring to the FIG. 19, the UE 1900 may include a processor 1910, a transceiver 1920 and a memory 1930. However, all of the illustrated components are not essential. The UE 1900 may be implemented by more or less components than those illustrated in the FIG. 19. In addition, the processor 1910 and the transceiver 1920 and the memory 1930 may be implemented as a single chip according to another embodiment.

The aforementioned components will now be described in detail.

The processor 1910 may include one or more processors or other processing devices that control the proposed function, process, and/or method. Operations of the UE of FIG. 1 to FIG. 18 may be implemented by the processor 1910.

The transceiver 1920 may be connected to the processor 1910 and transmit and/or receive a signal. In addition, the transceiver 1920 may receive the signal through a wireless channel and output the signal to the processor 1910. The transceiver 1920 may transmit the signal output from the processor 1910 through the wireless channel.

The memory 1930 may store the control information or the data included in a signal obtained by the UE 1900. The memory 1930 may be connected to the processor 1910 and store at least one instruction or a protocol or a parameter for the proposed function, process, and/or method. The memory 1930 may include read-only memory (ROM) and/or random access memory (RAM) and/or hard disk and/or CD-ROM and/or DVD and/or other storage devices.

Figure 20:
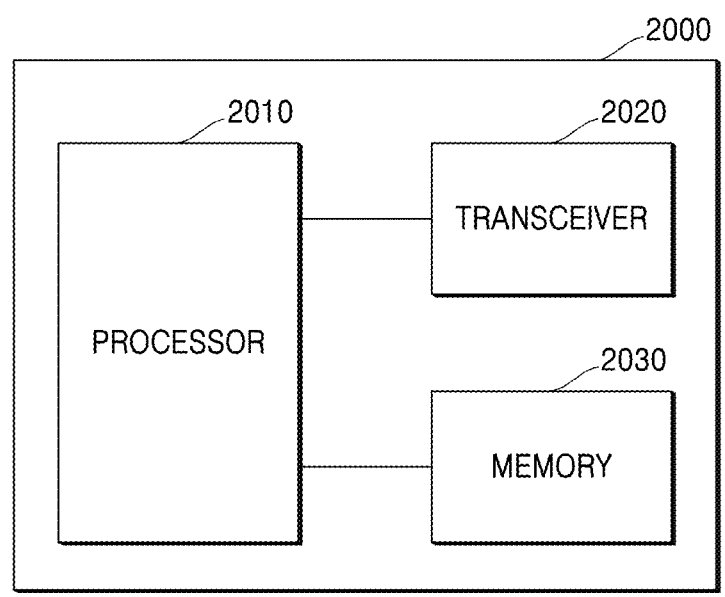
FIG. 20 illustrates a diagram of a base station according to an embodiment of the present disclosure.

FIG. 20 illustrates a diagram of a base station 2000 according to an embodiment of the present disclosure.

Referring to the FIG. 20, the base station 2000 may include a processor 2010, a transceiver 2020 and a memory 2030. However, all of the illustrated components are not essential. The base station 2000 may be implemented by more or less components than those illustrated in FIG. 20. In addition, the processor 2010 and the transceiver 2020 and the memory 2030 may be implemented as a single chip according to another embodiment.

The aforementioned components will now be described in detail.

The processor 2010 may include one or more processors or other processing devices that control the proposed function, process, and/or method. Operations of the base station (e.g. gNB) of FIG. 1 to FIG. 18 may be implemented by the processor 2010.

The transceiver 2020 may be connected to the processor 2010 and transmit and/or receive a signal. The signal may include control information and data. In addition, the transceiver 2020 may receive the signal through a wireless channel and output the signal to the processor 2010. The transceiver 2020 may transmit a signal output from the processor 2010 through the wireless channel.

The memory 2030 may store the control information or the data included in a signal obtained by the base station 2000. The memory 2030 may be connected to the processor 2010 and store at least one instruction or a protocol or a parameter for the proposed function, process, and/or method. The memory 2030 may include read-only memory (ROM) and/or random access memory (RAM) and/or hard disk and/or CD-ROM and/or DVD and/or other storage devices.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact discROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   identifying whether a small data transmission (SDT) procedure is ongoing in a radio resource control (RRC) inactive state;
   while the SDT procedure is ongoing, monitoring for a system information (SI) change indication in any paging occasion at least once per modification period;
   while the SDT procedure is not ongoing, monitoring for an SI change indication in the UE's paging occasion; and
   identifying the SI change indication, based on the monitoring.

2. The method of claim 1, wherein a discontinuous reception (DRX) cycle is determined based on a shortest DRX value among UE specific DRX values including a UE specific DRX value configured by an RRC, a UE specific DRX value configured by a non-access-stratum (NAS) and a default DRX value broadcasted via system information.

3. The method of claim 1, wherein while the SDT procedure is ongoing, a paging indication for a paging message in paging downlink control information (DCI) is not monitored at the UE.

4. The method of claim 1, wherein while the SDT procedure is not ongoing, monitoring a paging indication for a paging message in paging downlink control information (DCI), in a paging occasion in every discontinuous reception (DRX) cycle.

5. The method of claim 1, wherein while the SDT procedure is not ongoing, based on system information block1 (SIB 1) including supplementary uplink (SUL) configuration of a message 1 resource in which the UE uses for an SI request and a criteria to select an SUL being met, initiating a random access for a message 1 based on the supplementary uplink.

6. The method of claim 1, wherein while the SDT procedure is not ongoing, based on system information block1 (SIB 1) including normal uplink (NUL) configuration of a message 1 resource in which the UE uses for an SI request and a criteria to select an NUL being met, initiating a random access for a message 1 based on the NUL.

7. The method of claim 1, further comprising:
   while the SDT procedure is ongoing, monitoring for a notification associated with earthquake and tsunami warning system (ETWS) or commercial mobile alert system (CMAS) in any paging occasion at least once per default cycle.

8. The method of claim 7, wherein information regarding a length of the default cycle is received via system information.

9. A user equipment (UE) in a wireless communication system, the UE comprising:
   a transceiver; and
   a processor coupled with the transceiver and configured to:
      identify whether a small data transmission (SDT) procedure is ongoing in a radio resource control (RRC) inactive state,
      while the SDT procedure is ongoing, monitor for a system information (SI) change indication in any paging occasion at least once per modification period,
      while the SDT procedure is not ongoing, monitor for an SI change indication in the UE's paging occasion, and
      identify the SI change indication, based on the monitoring.

10. The UE of claim 9, wherein the processor is further configured to:
    while the SDT procedure is ongoing, monitor for a notification associated with earthquake and tsunami warning system (ETWS) or commercial mobile alert system (CMAS) in any paging occasion at least once per default cycle.

11. The UE of claim 9, wherein a discontinuous reception (DRX) cycle is determined based on a shortest DRX value among UE specific DRX values including a UE specific DRX value configured by an RRC, a UE specific DRX value configured by a non-access-stratum (NAS) and a default DRX value broadcasted via system information.

12. The UE of claim 9, wherein while the SDT procedure is ongoing, a paging indication for a paging message in paging downlink control information (DCI) is not monitored at the UE.

13. The UE of claim 9, wherein the processor is further configured to:
    while the SDT procedure is not ongoing, monitor a paging indication for a paging message in paging downlink control information (DCI) in a paging occasion in every discontinuous reception (DRX) cycle.

14. The UE of claim 9, wherein the processor is further configured to:
    while the SDT procedure is not ongoing, based on system information block1 (SIB 1) including supplementary uplink (SUL) configuration of a message 1 resource in which the UE uses for an SI request and a criteria to select an SUL being met, initiate a random access for a message 1 based on the supplementary uplink.

15. The UE of claim 9, wherein the processor is further configured to:
    while the SDT procedure is not ongoing, based on system information block1 (SIB 1) including normal uplink (NUL) configuration of a message 1 resource in which the UE uses for an SI request and a criteria to select an NUL being met, initiate a random access for a message 1 based on the NUL.

16. The UE of claim 9, wherein the processor is further configured to
    while the SDT procedure is not ongoing, monitor for a notification associated with earthquake and tsunami warning system (ETWS) or commercial mobile alert system (CMAS) in the UE's paging occasion in every discontinuous reception (DRX) cycle.

17. The UE of claim 10, wherein information regarding a length of a default cycle is received via system information.

18. The UE of claim 9, wherein the processor is further configured to:
- while the SDT procedure is not ongoing, monitor for a notification associated with earthquake and tsunami warning system (ETWS) or commercial mobile alert system (CMAS) in the UE's paging occasion in every discontinuous reception (DRX) cycle.

* * * * *